(12) United States Patent
Beaurepaire

(10) Patent No.: US 10,276,048 B2
(45) Date of Patent: Apr. 30, 2019

(54) VEHICLE BOARDING AREA

(71) Applicant: HERE Global B.V., Eindhoven (NL)

(72) Inventor: Jerome Beaurepaire, Berlin (DE)

(73) Assignee: Here Global B.V., Eindhoven (NL)

( * ) Notice: Subject to any disclaimer, the term of this patent is extended or adjusted under 35 U.S.C. 154(b) by 0 days.

(21) Appl. No.: 16/106,438

(22) Filed: Aug. 21, 2018

(65) Prior Publication Data

US 2018/0357901 A1    Dec. 13, 2018

Related U.S. Application Data

(63) Continuation of application No. 15/592,442, filed on May 11, 2017, now Pat. No. 10,089,872.

(51) Int. Cl.

| | |
|---|---|
| *G07C 5/00* | (2006.01) |
| *G08G 1/00* | (2006.01) |
| *G08G 1/14* | (2006.01) |
| *G08G 1/16* | (2006.01) |
| *B60W 40/00* | (2006.01) |
| *H04L 29/08* | (2006.01) |
| *G08G 1/0967* | (2006.01) |

(52) U.S. Cl.
CPC ............. *G08G 1/146* (2013.01); *B60W 40/00* (2013.01); *G07C 5/00* (2013.01); *G08G 1/0967* (2013.01); *G08G 1/143* (2013.01); *G08G 1/144* (2013.01); *G08G 1/147* (2013.01); *G08G 1/148* (2013.01); *G08G 1/162* (2013.01); *G08G 1/164* (2013.01); *G08G 1/166* (2013.01); *G08G 1/168* (2013.01); *G08G 1/20* (2013.01); *H04L 67/12* (2013.01)

(58) Field of Classification Search
CPC ........ B60Q 9/008; B60Q 1/442; G08G 1/162; G08G 1/16; G08G 1/012; G08G 1/0962
See application file for complete search history.

(56) References Cited

U.S. PATENT DOCUMENTS

| | | | |
|---|---|---|---|
| 6,393,362 B1 | 5/2002 | Burns | |
| 6,791,471 B2 | 9/2004 | Wehner et al. | |
| 7,427,929 B2 * | 9/2008 | Bauer | G08G 1/162 |
| | | | 307/9.1 |
| 7,755,472 B2 | 7/2010 | Grossman | |
| 8,352,111 B2 | 1/2013 | Mudalige | |
| 8,620,549 B2 | 12/2013 | Nickolaou et al. | |
| 8,630,768 B2 | 1/2014 | McClellan et al. | |
| 8,768,568 B2 | 7/2014 | Uhlmann et al. | |

(Continued)

FOREIGN PATENT DOCUMENTS

JP    2009282713 A    12/2009

OTHER PUBLICATIONS

K. Herbie Huff et al. "Transit Applications of Vehicle-to-Vehicle and Vehicle-to Infrastructure Technology", Aug. 1, 2014, pp. 1-11.

*Primary Examiner* — Omeed Alizada
(74) *Attorney, Agent, or Firm* — Lempia Summerfield Katz LLC

(57) ABSTRACT

Embodiments include apparatus and methods for defining vehicle boarding areas. Data indicative of boarding a first vehicle is received. A boarding area requirement associated with the first vehicle is calculated. A boarding area message in response to the boarding area requirement is generated. The boarding area message for the boarding area of the first vehicle is provided to a second vehicle or to a user.

20 Claims, 13 Drawing Sheets

(56) References Cited

U.S. PATENT DOCUMENTS

| | | |
|---|---|---|
| 8,854,197 B2 | 10/2014 | Ikeda et al. |
| 9,019,380 B2 | 4/2015 | Schenken et al. |
| 9,067,595 B2 | 6/2015 | Wright et al. |
| 9,146,898 B2 | 9/2015 | Ihlenburg et al. |
| 9,688,199 B2 | 6/2017 | Koravadi |
| 2005/0197771 A1 | 9/2005 | Seick et al. |
| 2012/0194356 A1 | 8/2012 | Haines et al. |
| 2013/0141578 A1 | 6/2013 | Chundrlik, Jr. et al. |
| 2013/0147638 A1 | 6/2013 | Ricci |
| 2015/0149019 A1* | 5/2015 | Pilutti .................... G08G 1/22 701/23 |
| 2017/0371347 A1* | 12/2017 | Cohen .................. G05D 1/0214 |

\* cited by examiner

VEHICLE BOARDING AREA

CROSS REFERENCE TO RELATED APPLICATION

This application is a continuation under 35 U.S.C. § 120 and 37 C.F.R. § 1.53(b) of U.S. patent application Ser. No. 15/592,442 filed May 11, 2017, the disclosure of which is incorporated herein by reference in its entirety.

FIELD

The following disclosure relates to navigation related applications and driving related applications associated with a boarding area for a vehicle.

Space is limited along many streets and roadways. Bicycle paths and pedestrian paths compete with parking spaces for the limited space left after defining the lanes of travel for the street. In many examples, parking spaces are immediately adjacent to the lanes of travel. When doors are opened on the parked vehicle, or people approach the parked vehicle, the space of the lanes is encroached. Safety concerns arise because of the risk that a vehicle traveling in the lanes of travel may collide with, or become dangerously close to, a parked vehicle or the people near the parked vehicle. In many circumstances, moving vehicles must adjust their path of travel in varying degrees in order to maintain a safe distance between the moving vehicles and people that are boarding or unboarding vehicles parked adjacent to lanes of travel.

The following embodiments include geographic databases, routing techniques, assisted driving techniques, autonomous driving techniques, driver warnings, traffic reporting techniques, boarding user guidance, parking guidance, and/or other features to limit the risks associated with boarding and unboarding vehicles parked adjacent to lanes of travel.

SUMMARY

In one embodiment, a method includes receiving data indicative of boarding a first vehicle, calculating, by a processor, a boarding area requirement associated with the first vehicle, generating, by the processor, a boarding area message in response to the boarding area requirement, and providing the boarding area message for the boarding area of the first vehicle to a second vehicle or to a user.

In another embodiment, an apparatus comprises at least one sensor configured to collect data indicative of boarding a first vehicle, a controller configured to calculate a boarding area requirement associated with the first vehicle and generate a boarding area message in response to the boarding area requirement, and an interface configured to provide the boarding area message for the boarding area of the first vehicle to a second vehicle or to a user of the first vehicle.

In another embodiment, a non-transitory computer readable medium including instructions for at least one processor to cause the at least one processor to perform receiving data indicative of boarding a vehicle, wherein the vehicle is located in a parking spot or predicted to be located in the parking spot, calculating an access area associated with the vehicle, the access area defined based on a spatial area requirement or a temporal requirement, generating a boarding area message in response to the access area, and providing the boarding area message for the access area to a user of the vehicle or a nearby vehicle.

BRIEF DESCRIPTION OF THE DRAWINGS

Exemplary embodiments of the present invention are described herein with reference to the following drawings.

DETAILED DESCRIPTION

A vehicle boarding area or a vehicle access area is a geographic space adjacent to a vehicle or a vehicle parking space. The vehicle boarding area or vehicle access area may be utilized by a driver and/or passengers for boarding (e.g., embarking) the vehicle, unboarding (e.g., disembarking) the vehicle, or both. Boarding refers to one or more drivers or passengers entering the vehicle from outside of the vehicle. Unboarding refers to one or more drivers or passengers exiting the vehicle from inside of the vehicle to outside of the vehicle. The vehicle boarding area or vehicle access area may be utilized for loading or unloading cargo into the vehicle. The vehicle boarding area may be defined based on the position of the parked vehicle or based on the position of the vehicle parking space in which the parked vehicle is parked. The vehicle boarding area may have a variety of shapes including an extension of the footprint of the parked vehicle, an extension of the perimeter of the parking space, or a predetermined shape from each boarding point of the parked vehicle. Boarding points may include doors, trunks, hatchback, or other cargo areas.

The vehicle boarding area may be used in navigation related applications and driving related applications. Example embodiments may include routing, traffic alerts, assisted driving, autonomous driving, parking selection, or other features. The vehicle boarding area may be encoded into a geographic database including one or more attributes that describe the location of the vehicle board area and the dimensions of the vehicle boarding area. The vehicle boarding area may be associated in the geographic database with one or more attributes that describe restrictions associated with the vehicle boarding area. The restrictions may relate to traffic near the vehicle boarding area, warnings issued in proximity to the vehicle boarding area, or driving commands in response to the vehicle boarding area. In some example, other users or vehicles in the area steered or routed around the vehicle boarding area, or at least warned to reduce the element of surprise when users board or unboard a parked vehicle.

A specialized programmed device may calculate the vehicle boarding area and apply specialized algorithms to improve the impact on traffic and safety of drivers and passengers. When applied to a specialized navigation algorithm, the vehicle boarding area allows other drivers to avoid the designated vehicle boarding area. When applied to a specialized traffic algorithm, the vehicle boarding area reduces the effects of slowing traffic that could be caused by vehicle boarding. When applied to specialized warning algorithms, the vehicle boarding area facilitates ease of boarding and more efficient use of the boarded vehicle. In any of these embodiments, the safety of the passengers and/or drivers of the boarded vehicle and vehicles of vehicles in the vicinity are improved.

Figure 1:
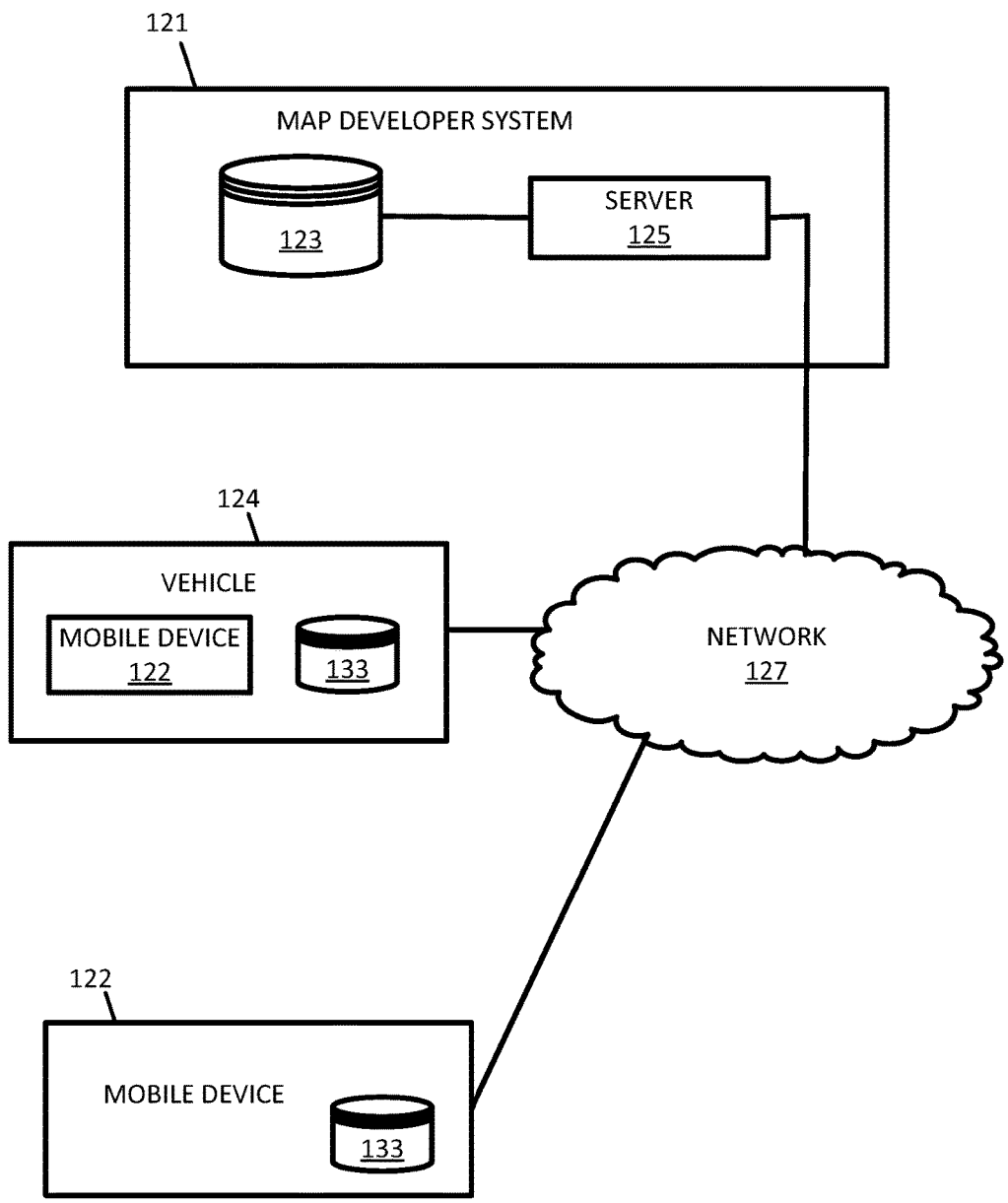
FIG. 1 illustrates an example system for navigation related applications and driving related applications associated with a boarding area for a vehicle.

FIG. 1 illustrates an example system for navigation related applications and driving related applications associated with a boarding area, or access area, for a vehicle. In FIG. 1, one or more vehicles 124 and/or one or more mobile devices 122 are connected to a map developer system 121 though the network 127. The vehicles 124 may be directly connected to the server 125 or through an associated mobile device 122. The object detection system 121, including a server 125 and a database 123, exchanges (e.g., receives and sends) data from the vehicles 124 and/or mobile devices 122. The mobile devices 122 include local databases 133, which may be modified according to the server 125 and may include a subset of the data of database 123. Any of the features described herein for database 123 may be applied to the local database 133. The mobile device 122 may be standalone device such as smartphones or devices integrated with vehicles. The following embodiments may alternatively be performed by the mobile device 122. Additional, different, or fewer components may be included.

The server 125 may receive data indicative of boarding a first vehicle. The data indicative of boarding may be a boarding detection message, a boarding request message, a parking request, a navigation request, or another type of message.

The boarding detection message may be generated by a vehicle 124 or mobile device 122 in response to a user event that signals that boarding is occurring, is predicted to occur, or will occur within a particular time frame. The user event may be identified from sensor data, user entry data, communication data or activity data. The sensor data may include image data, distance data, proximity data, door sensor data, or another example. One or more sensors associated with the vehicle 124 or the mobile device 122 may detect that a driver or passenger is approaching. In another example, the sensor data may include audio data including words or other sounds produced by the driver. The mobile device 122 or the vehicle 124 may include a voice recognition device that identifies keywords or keyphrases spoken by the user that are indicative of boarding the vehicle. Keywords or keyphrases may include "board," "get in car," "here we are," or "ready." In another example, the sensor data from a door sensor may indicate whether a door has been open. Additional sensor data examples are described herein in association with FIG. 2.

The sensor data may include tracking a user that is in the vehicle 124 or approaching the vehicle 124 for signs of boarding or unboarding the vehicle. When the sensor data includes image data, location tracking may involve analysis of the images. When the sensor data includes proximity data, the location tracking may include determine whether or not the proximity data includes indication of an approaching user. Internal to the vehicle, the location tracking may include reaching for a door handle or turning off the vehicle 124.

The communication data may include communication between the vehicle 124 and the mobile device 122 of an approaching user. The communication data may be an ad-hoc network initiation (e.g., Bluetooth) or location data that is transmitted over such a network. The communication data may include location data or other information transmitted wirelessly (e.g., Wi-fi, infrared, or cellular) between the mobile device 122 and the vehicle 124.

The user entry data may include information entered by the user to the vehicle 124 or the mobile device 122. The user entry data may be a direction indication from the user (e.g., "board vehicle" button or a "request vehicle boarding area" button) via the vehicle 124 or the mobile device 122. The user entry data may include a request for a route with an origin location for the vehicle. The user entry data may include activation of one or more system in the vehicle 124 such as starting the ignition, engaging a navigation system, or engaging the transmission (e.g., placing the vehicle in gear or in drive). The boarding request may be generated in response to the user entry data. The user entry data may indicate that one or more users have touched the vehicle, a door handle, or wirelessly unlocked the door or cargo area by remote.

The activity data may include data related to one or more activities of the user. The activity data may include calendar information. For example, a user's calendar may include an event listing for the user that suggests only one passenger in the vehicle (e.g., a haircut) or an event listing for the user that suggests multiple passengers in the vehicle (e.g., a family picnic). The activity data may include social media information. For example, the user's social media account may include a first type of event that suggests only one passenger (e.g., a check-in for one person) or a second type of event that suggests multiple passengers (e.g., a check-in for multiple people).

The boarding request message may include a request from the user to board or unboard the vehicle. A passenger of the vehicle may signal that the destination has been reached and one or more passengers will be unboarding the vehicle. The passenger may select the boarding request from a console in the vehicle. The passenger may cause the boarding request message to be generated by turning off the vehicle, unlocking a door, or opening a door. The parking request may be a request to park the vehicle from the passenger. The parking request may be in response to an automated parking function of the vehicle.

The navigation request may designate a destination for a route. When the vehicle 124 or the mobile device 122 approaches the destination, for example, travels within a predetermined distance to the destination, the location of the vehicle 124 or the mobile device 122 and the navigation are data indicative of boarding the first vehicle.

Other types of messages that are data indicative of boarding the first vehicle may include communications between users, parking payment, or an unlock message to the vehicle. For communications, when the mobile device 122 or another system associated with the vehicle 124 receives a text message, instant message, or phone call that indicates parking or arrival at the destination, the communication is data indicative of boarding the vehicle. For parking payments, when the user submits a payment for parking through mobile device 122, a parking console, or wireless communication, the payment message is data indicative of boarding the vehicle. For the unlock message, when a user uses a radio transmitter, fingerprint sensor, or another type of message to unlock the vehicle 124, the unlock message is data indicative of boarding the vehicle.

The server 125 may calculate a boarding area requirement associated with the first vehicle. The boarding area requirement may define a geographic area or space. That is, the boarding area requirement may include data indicative of one or more shapes or vertices for the vehicle boarding area, dimensions of the vehicle boarding area, and/or locations for the vehicle boarding area, which may be measured from the first vehicle or a geographic reference point. The boarding area may be constructed (e.g., drawn on a map or displayed) based on the boarding area requirement. The boarding area requirement may include data indicative of one or more doors or cargo areas for the vehicle. The boarding area requirement may include a time period for the vehicle boarding area. The time period may be an estimate of the time needed for boarding or unboarding passengers. The time period may be a time period that the boarding area, or the boarding area message, is valid or is applied. The boarding area message may include a data field for the time period and may expire in response to the time period elapsing.

The server 125 may generate a boarding area message in response to the boarding area requirement and the boarding area message may include one or more components of the boarding area requirement. The boarding area message may include a dimension of the boarding area, a location of the center of the boarding area, and/or locations or lengths of one or more vertices or edges of the boarding area. The server 125 sends the boarding area message for the boarding area of the first vehicle to a second vehicle. The boarding area message may instruct the second vehicle to warn a driver of the second vehicle. For example, a display in the vehicle 124 may display a message to the driver or an audio system in the vehicle 124 may play a message. The message may be "watch for boarding pedestrians," "hazard on the right" or "beware of vehicle leaving parking spot."

The boarding area message may be generated at one vehicle and sent to another vehicle in vehicle to vehicle communication. The boarding area message may describe the location of the boarding area for the sending vehicle, and the receiving vehicle may respond to the location by adjusting one or more control system of the receiving vehicle. For example, the boarding area message may instruct, or provide a suggestion to, the second vehicle, when the second vehicle includes a driver assistance system, to assist the driver in a driving function to avoid or account for the vehicle boarding area. For example, the driving assistance system may issue a lane departure warning in response to the vehicle boarding area. The vehicle boarding area may reduce the size of a lane used by the driver assistance system. The driver assistance system may turn off or adjust a cruise control system in response to the vehicle boarding area.

The boarding area message may instruct the second vehicle, when the second vehicle includes an autonomous driving system, to control the second vehicle. For example, the autonomous driving system may cause the second vehicle to steer away from the vehicle boarding area. The autonomous driving system may adjust the center of the lane of travel to account for the vehicle boarding area. As an illustration, consider a lane of travel that has a standard lane width (e.g., 3.7 meters, 4 meters, 12 feet, or 14 feet), in which the autonomous driving system centers the vehicle at a corresponding center point (e.g., 1.85 meters, 2 meters, 6 feet, or 7 feet from the left edge of the lane. When the vehicle boarding area is present and encroaches into the lane of travel for an encroachment amount about 1 meter or 4 feet on the right edge of the lane, the autonomous vehicle centers the vehicle closer to the left edge of the lane. The autonomous vehicle may center the vehicle at the original center point adjusted by half of the encroachment amount (e.g., 7−4/2=5 feet, 6−4/2=4 feet, 2−1/2=1.5 meters, or 1.85−1/2=1.35 meters) from the left edge of the lane. In other examples, the autonomous driving system may slow the vehicle in response to the vehicle boarding area. In other examples, the autonomous driving system may stop the vehicle in response to the vehicle boarding area.

The vehicle boarding area may also improve the efficiency of data processing for an autonomous vehicle. Consider an example in which an autonomous vehicle analyzes its environment to identify a pedestrian and must determine whether or not the pedestrian is likely to walk into the path of the autonomous vehicle. This analysis, which must consider the trajectory of the pedestrian, which is very complex to calculate. Using the vehicle boarding area, the autonomous need only consider the location outline of the vehicle boarding area and avoid the vehicle boarding area. Therefore, the data processing required in avoiding a pedestrian boarding or unboarding a vehicle is reduced.

Figure 2:
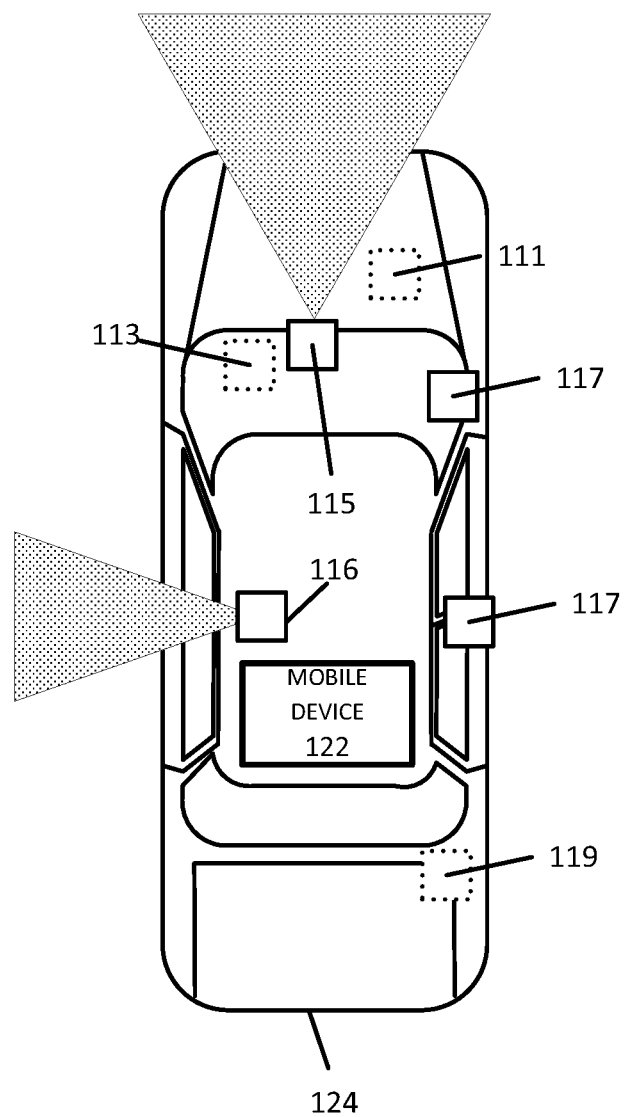
FIG. 2 illustrates example sensors for a vehicle in the system of FIG. 1.

FIG. 2 illustrates example sensors for a vehicle in the system of FIG. 1. The vehicle may be the parked vehicle that is being boarded or unboard. The vehicle may be the vehicle that is warned of the vehicle boarding area, or caused to avoid the vehicle boarding area. The sensors may include an engine sensor 111, an internal vehicle sensor 113, an external vehicle sensor 114, an image capture device 115, a light detection and ranging (LiDAR) system 116, a door sensor 117, and a cargo sensor 119, which may be referred to as sensor array individually, collectively, or in any combination. Some of the sensors may be used to detect when the vehicle boarding area should be generated (i.e., when the vehicle is being boarded or unboarded). Some of the sensors may be used to help the vehicle avoid the vehicle boarding area. Some of the sensors may be used to define the size or duration of the vehicle boarding area. Additional, different or fewer sensors may be included.

The LiDAR system 116 includes one or more laser pulses emitted from the vehicle 124 and reflected from one or more objects. The LiDAR system 116 may detect the laser pulses and analyze the reflection to generate optical distance data that describes the location and distance of the object from the LiDAR system 116. As an alternative, to the LiDAR system 116 other optical systems such as structured light may be used.

The image capture system 115 may include a camera, a sound distance system such as sound navigation and ranging (SONAR), a radio distancing system such as radio detection and ranging (RADAR) or another sensor. The camera may be a visible spectrum camera, an infrared camera, an ultraviolet camera or another camera.

The LiDAR system 116 and/or the image capture system 115, or any sensor array, may collect sensor data that describes whether or not users are boarding or unboading the vehicle 124. The sensory array may collect data as the users approach the vehicle.

The LiDAR system 116 and/or the image capture system 115, or any sensor array, may collect sensor data that describes how much space is taken up by the users as they board or unboard the vehicle.

The vehicles 124 may include a global positioning system, a dead reckoning-type system, cellular location system, or combinations of these or other systems, which may be referred to as position circuitry or a position detector. The positioning circuitry may include suitable sensing devices that measure the traveling distance, speed, direction, and so on, of the mobile device 122. The positioning system may also include a receiver and correlation chip to obtain a GPS signal. Alternatively or additionally, the one or more detectors or sensors may include an accelerometer built or embedded into or within the interior of the mobile device 122.

In some alternatives, additional sensors may be included in the vehicle 124. An engine sensor 111 may include a throttle sensor that measures a position of a throttle of the engine or a position of an accelerator pedal, a brake senor that measures a position of a braking mechanism or a brake pedal, or a speed sensor that measures a speed of the engine or a speed of the vehicle wheels. The engine sensor 111 may determine when the vehicle is entering a parking spot, which indicates that the vehicle boarding area should be defined.

Another additional example, vehicle sensor 113, may include a steering wheel angle sensor, a speedometer sensor, or a tachometer sensor. These sensors may determine when the vehicle 124 is entering a parking space and the vehicle boarding area should be defined. For example, the mobile device 122 or the server 125 may determine that the vehicle boarding area should be defined in response to the speed of the vehicle falling below a threshold speed (e.g., 2 mph or 0.1 meters per second). The mobile device 122 or the server 125 may determine that the vehicle boarding area should be defined in response to an angle of the steering wheel that suggests parallel parking. The mobile device 122 or the server 125 may determine that the vehicle boarding area should be defined in response to a tachometer reading that suggests the vehicle is idling (e.g., a tachometer reading less than a threshold such as 1000 revolutions per minute).

The internal vehicle sensor 113 may include a microphone, an internal camera, a seat sensor, a motion sensor, or another sensor to detect the internal environment of the vehicle 124. The vehicle sensor 113 may determine when the vehicle 124 is entering a parking space, when the passengers of the vehicle are about to unboard the vehicle, or information regarding the types of passengers and quantities of passengers.

The external vehicle sensor 114 may include a microphone, a motion sensor, or another sensor to detect the internal environment of the vehicle 124. The vehicle sensor 113 may determine when passengers of the vehicle are about to board the vehicle, or information regarding the types of passengers and quantities of passengers.

The door sensor 117 may collect data indicative of whether a door has been opened and/or to what extent (e.g., an angle) that the door has been opened. The door sensor may be a push button sensor that indicates whether the door is ajar or closed. The door sensor may be an angle sensor. Similarly, the cargo sensor 119 determines when a trunk, hatchback, or another cargo area has been accessed. In another alternative or addition, an interior cargo sensor may detect whether the cargo area is loaded or unloaded. If cargo is present, there is an increased likelihood that cargo will be unloaded, and the cargo opening used, in the next boarding. Similarly, if cargo was loaded in the last boarding, there is an increased likelihood that cargo will be unloaded, and the cargo opening used, in the next boarding. The data collected by the interior cargo sensor is a trigger for the boarding area adjacent to the cargo area.

The mobile device 122 integrated in the vehicle 124 may include assisted driving vehicles such as autonomous vehicles, highly assisted driving (HAD), and advanced driving assistance systems (ADAS). Any of these assisted driving systems may be incorporated into mobile device 122. Alternatively, an assisted driving device may be included in the vehicle. The assisted driving device may include memory, a processor, and systems to communicate with the mobile device 122. The assisted driving vehicles may response to geographic data received from geographic database 123 and the server 125, which may have been updated. The assisted driving vehicle may be selected a route based on any of the examples herein, including in response to the vehicle boarding area.

The term autonomous vehicle may refer to a self-driving or driverless mode in which no passengers are required to be on board to operate the vehicle. An autonomous vehicle may be referred to as a robot vehicle or an automated vehicle. The autonomous vehicle may include passengers, but no driver is necessary. These autonomous vehicles may park themselves or move cargo between locations without a human operator. Autonomous vehicles may include multiple modes and transition between the modes. The autonomous vehicle may steer, brake, or accelerate the vehicle based on the position of the vehicle in order to avoid or account for the boarding area. The autonomous vehicle may extract one or more locations or dimensions for the boarding area from the boarding area message and adjust steering, braking, or accelerating in response to the locations or dimensions for the boarding area. For an autonomous vehicle, the mobile device 122 or vehicle 124 may generate such a driving command for the second vehicle in response to the boarding area message.

A highly assisted driving (HAD) vehicle may refer to a vehicle that does not completely replace the human operator. Instead, in a highly assisted driving mode, the vehicle may perform some driving functions and the human operator may perform some driving functions. Vehicles may also be driven in a manual mode in which the human operator exercises a degree of control over the movement of the vehicle. The vehicles may also include a completely driverless mode. Other levels of automation are possible. The HAD vehicle may control the vehicle through steering or braking in response to the on the position of the vehicle and the vehicle boarding area. For a HAD vehicle, the mobile device 122 or vehicle 124 may generate such a driving command for the second vehicle in response to locations or dimensions from the boarding area message.

Similarly, ADAS vehicles include one or more partially automated systems in which the vehicle alerts the driver. The features are designed to avoid collisions automatically. Features may include adaptive cruise control, automate braking, or steering adjustments to keep the driver in the correct lane. ADAS vehicles may issue warnings for the driver based on the position of the vehicle and the location and/or dimensions of the boarding area. For a ADAS vehicle, the mobile device 122 or vehicle 124 may generate such a driving command for the second vehicle in response to in response to the locations or dimensions from the boarding area message.

The server 125 or the vehicle 124 may calculate a route from an origin to a destination avoiding the vehicle boarding area. The origin and/or the destination may be received at the server 125 from the vehicle 124 and the route is calculated from the geographic database 123. Alternatively, the route may be calculated from local database 133. The route includes multiple segments stored in either of the databases. The route may be calculated according to the shortest distance, based on length or distance of the set of road segments, or according the estimated time to traverse the set of road segments. Example routing techniques include the A* algorithm and the Dijkstra algorithm.

Figure 3:
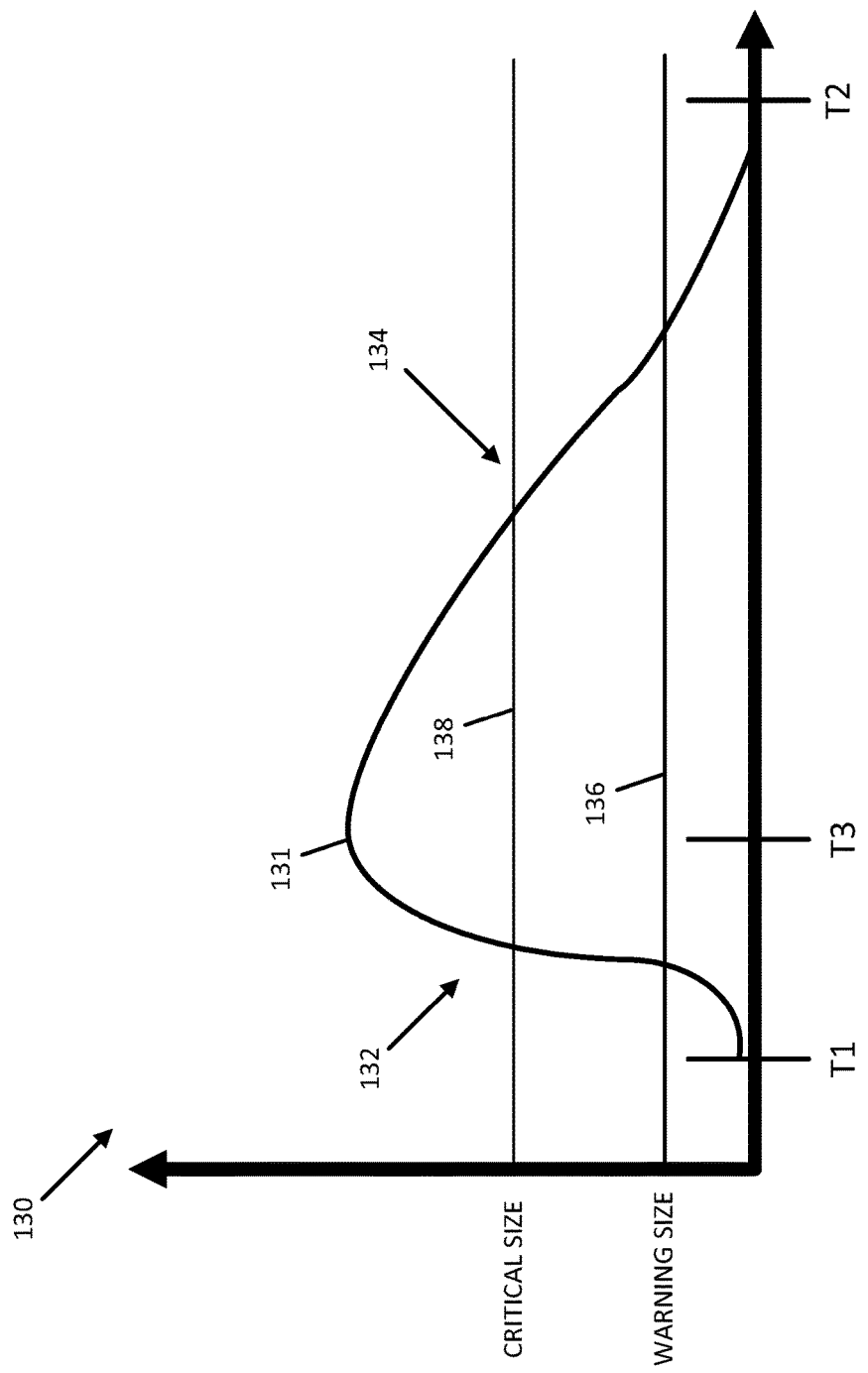
FIG. 3 illustrates example time dependent chart for size of a boarding area.

FIG. 3 illustrates example time dependent chart 130 for size of a boarding area or access zone. In one example, the boarding area may quickly increase in size to a maximum size and then slowly decrease in size back to zero.

At time T1 a passenger or driver has been detected in the vicinity of the vehicle or is approaching the vehicle. At time T2 the boarding process has ended. From time T1 to T2 the vehicle boarding area has a nonzero size. At time T3 a maximum vehicle boarding area size occurs when the passengers or driver are boarding the vehicle or predicted to board vehicle. The time between time T1 and time T3 may be the pre-boarding time period and the time between time T3 and time T2 may be a post-boarding time period, but it is noted that the actual boarding process may overlap one or both time periods. The size of the vehicle boarding area may vary in a variety of patterns. A step function, a second order function, or other types of function may describe the change in size of the vehicle boarding area versus time.

A warning message or a critical message may be generated depending on the size of the vehicle boarding area A data field component of the boarding message may indicate whether the boarding message is a warning message (or at a warning level) or is a critical message (or at a critical warning level). The time dependent chart 130 includes a warning level threshold 136 and a critical level threshold 138. When the size of the vehicle boarding area exceeds the warning level threshold 136, but it less than the critical level threshold 138, the mobile device 122 or the server 125 generates a warning message. When the size of the vehicle boarding area exceeds the critical level threshold 138, which means the size of the vehicle boarding area also exceeds the warning level threshold 136 because the critical level threshold 138 may be greater than the warning level threshold 136, the mobile device 122 or the server 125 generates a critical message.

The warning message or the critical message may be provided within the vehicle associated with the vehicle boarding area (i.e., the parked vehicle). The warning message or the critical message may be provided to a nearby vehicle through a communication interface. The warning message or the critical message may be displayed on an interface such as mobile device 122, on an internal vehicle display, or played to the passengers. An example warning message may include "potential vehicle boarding ahead." An example critical message may include merge "merge right—hazardous boarding ahead."

The size of the vehicle boarding area may depend on the types of passenger or driver that have been detected or are otherwise associated with the vehicle. The size of the vehicle boarding area may depend on the individual identities of the driver or passengers associated with the vehicle. The server 125 or the mobile device 122 may store and/or maintain one or more user profiles. The profiles may describe estimated time that types of users or particular types of users spend boarding or unboarding a vehicle. The profiles may describe estimated space required for types of users or particular types of users spend boarding or unboarding a vehicle. The types of users may be classified according to gender, age, or another characteristic. The age of a user may be in years or age range such as infant, child, adult, and senior citizen. The server 125 or the mobile device 122 may estimate boarding times using historical or crowdsourced data for users that below to the user classifications. A constellation of users profile may describe multiple user profiles in relation to one another. A constellation of users profile may include a relationship between a first user type and a second user type. An example profile may state that a first user (e.g., mother) alone is quicker in boarding than a second user (e.g., father), but when combined in a first user group including the first user (e.g., mother and children), they are slower than a second user group including the second user (e.g., father and children).

The server 125 or the mobile device 122 may receive a user input to request an amount of boarding time. That is, the user may select a desired boarding time to use by default or for individual trips boarding or unboarding the vehicle. The server 125 or the mobile device 122 may calculate the user's average boarding time across multiple measurements of historical boarding times. The estimated boarding times may be weighted according to destination, time of day, weather, or other factors.

The server 125 or the mobile device 122 may modify the vehicle boarding area according to one or more external factors. The external factors may include weather, destination, traffic, time of day, emergency vehicles, or type of cargo. The server 125 or the mobile device 122 may request weather data from an external source and modify the vehicle boarding area based on the weather data. Users may require more time to board a car during rain or other precipitation. In other examples, users may tend to board a vehicle more quickly when inclement weather is present. The server 125 or the mobile device 122 may request traffic data from an external source and modify the vehicle boarding area based on the traffic data. Users may tend to board more quickly during the rush hour or heavy traffic periods due to the sense of hurriedness during these times. Similarly, the server 125 or the mobile device 122 may modify the vehicle boarding area according to time of day, day of week, or day of the year. Users may board a vehicle more quickly during certain times of the day or certain time of the year.

The server 125 or the mobile device 122 may receive data indicative of a location or a route of a nearby emergency vehicle (e.g., ambulance, police, or fire). In one example, the data is received from a dispatch service, and in another example, the data relates to sensors (e.g., proximity, microphone, or camera) of the vehicle 124. The server 125 or the mobile device 122 may modify the vehicle boarding area according the nearby emergency vehicle. The size of the vehicle boarding area may be adjusted. The vehicle boarding area may be reduced so that emergency vehicles may more easily pass or so that users expedite the boarding procedure. In another example, the vehicle boarding area may be cancelled or temporarily suspended so that the emergency vehicle may more easily pass.

The server 125 or the mobile device 122 may modify the vehicle boarding area according to the types of cargo or destination. Some destinations such as shopping areas may suggest that cargo will be returned to the car. Some destination such as parks may suggest that children or pets and the corresponding equipment, which may slow boarding or require multiple doors or cargo areas.

Figure 4:
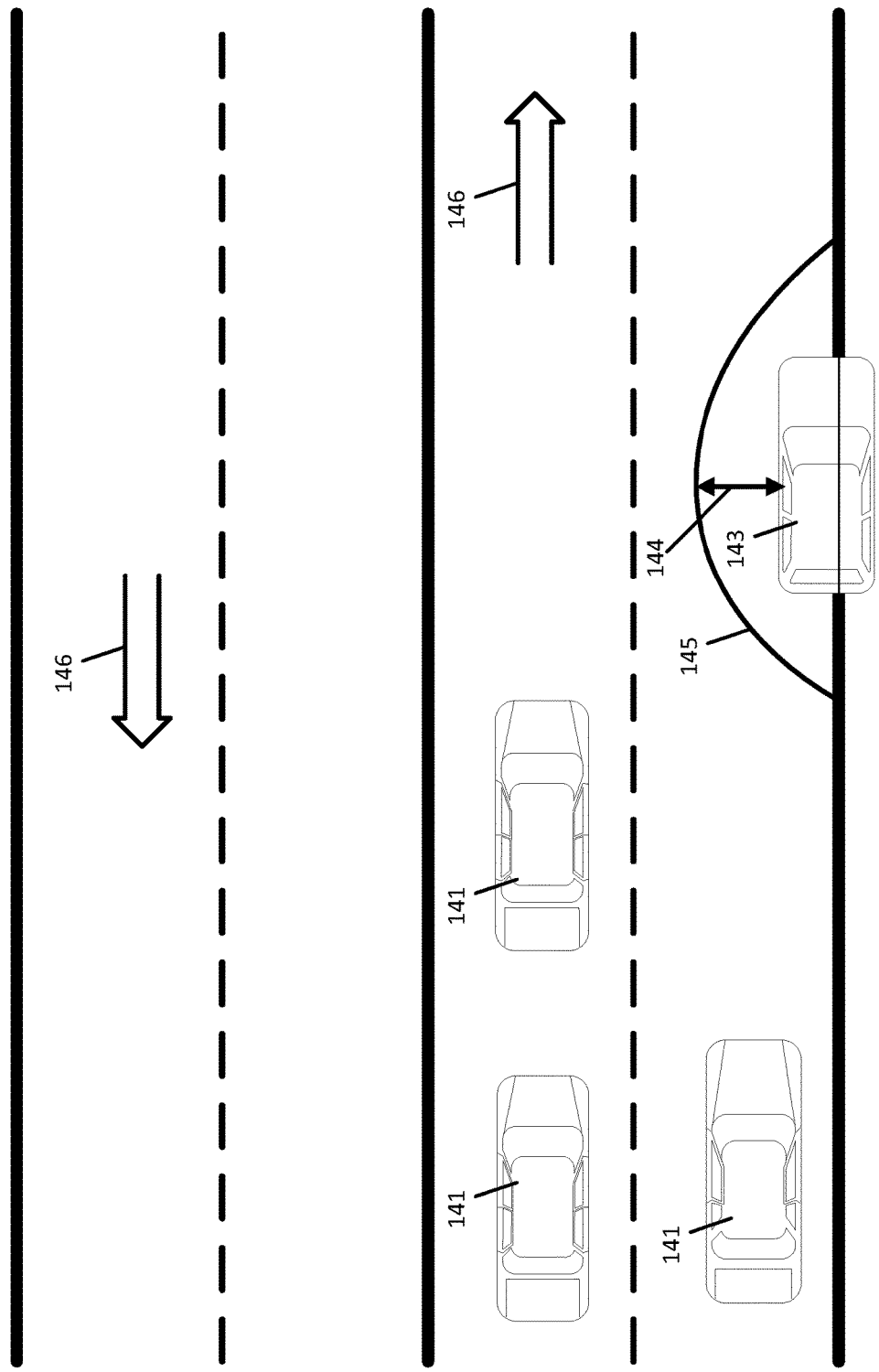
FIG. 4 illustrates an example roadway with a boarding area for a vehicle.

FIG. 4 illustrates an example roadway with a boarding area 145 for a parked vehicle 143. As shown by arrows 146, the roadway includes traffic in both directions on different sides of the divided road. On either side of the road, multiple lanes travel in the same direction. One or more nearby vehicles 141 may receive informative messages or control messages in response to the boarding area 145. The one or more nearby vehicles 141 are traveling in the same direction as the boarding area 145.

Consider an example for unboarding when the parked vehicle 143 signals that it has parked according to any of the examples herein or an example for boarding when one or more users approach the parked vehicle 143. The vehicle boarding area is defined at a predetermined distance from the center of the vehicle or a perimeter of the vehicle as shown by arrow 144. The predetermined distance may be constant or vary in time.

An approaching vehicle 141 receives the boarding area message and generating a warning or a driving command. In one example, the approaching vehicle 141 steers to avoid the boarding area. More specifically, the navigation system or driving system of the vehicle 141 may follow a route include a path through the lane of travel. In response, the vehicle 141 may adjust the route to avoid the boarding area message. In one example, the path through the lane is adjusted. In another example, as illustrated by FIG. 4, the routing path or driving path is adjusted into an adjacent lane. Before such an adjustment into the adjacent lane, a clear path may be determined using a proximity sensor or a user input. The adjustment to the routing path or the driving path of vehicle 141 may be calculated from the size of the vehicle boarding area.

Figure 5:
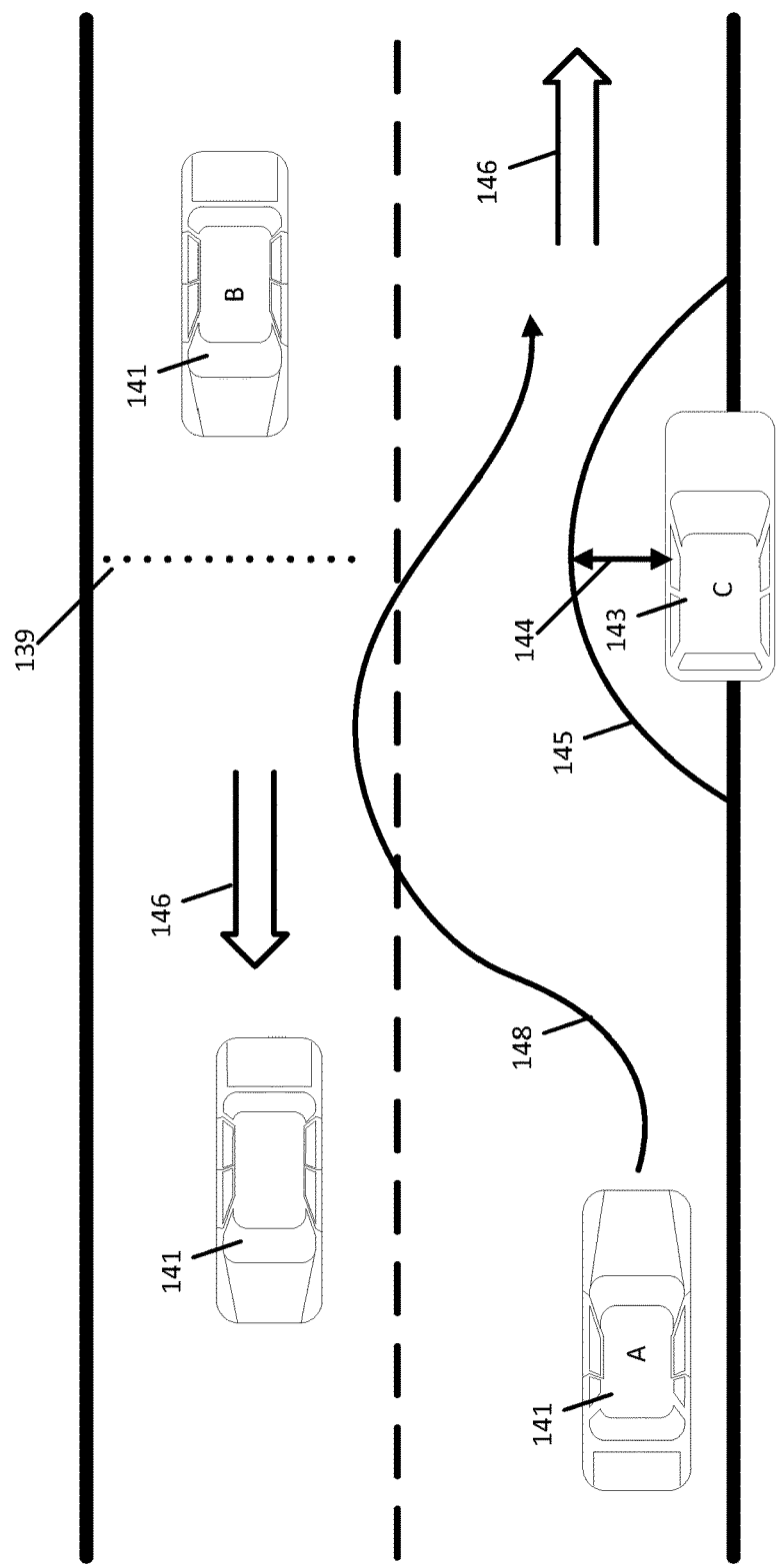
FIG. 5 illustrates another example roadway with a boarding area for a vehicle.

FIG. 5 illustrates another example roadway with a boarding area 145 for a parked vehicle 143. As shown by arrows 146, the roadway includes adjacent traffic lanes nearby vehicles 141 traveling in different directions such that the nearby vehicles 141 are not able to change lanes to avoid the boarding area 145. The nearby vehicles 141 include approaching vehicle A, oncoming vehicle B, and parked vehicle C. Several techniques may be used to assist the nearby vehicles 141 in avoiding the parked vehicle 143.

In one example, the nearby vehicle 141 avoids the vehicle boarding area through timing. As shown in FIG. 5, the ability of vehicle 141 to follow path 148 into the lane of oncoming traffic depends on whether or not any other vehicles are traveling at that point in the lane of oncoming traffic. The server 125 may receive a status of a stop light near dotted line 139. When the stop light has stopped oncoming traffic, the vehicle 141 may be instructed to follow path 148 by generating routing commands or driving commands for the vehicle 141. In another example, the server 125 may instruct the stop light to stop oncoming traffic so that vehicle 141 may follow path 148 and safely avoid the vehicle boarding area. In another example, a mobile device 124 or vehicle C may instruct users to wait before exiting the vehicle or boarding the vehicle according to the stoplight schedule. A message instructing the user to exit the vehicle or board the vehicle may be delayed as a function of a cycle or schedule of a nearby stoplight.

In another example, more than one vehicle 141 may receive message so that the vehicle boarding area can be avoided. In response to vehicle C parking or approaching a parking area or users approaching vehicle C, the vehicle boarding area is defined. Vehicle A may receive various messages warning of the vehicle boarding area. In addition, vehicle B may receive message to modify a route or driving in order to free up space for vehicle A to avoid the vehicle boarding area. For example, a speed of vehicle B may be adjusted to slow down (to increase the time before vehicle B would reach path 148) or speed up (to move vehicle B quickly past path 148) so that vehicle A has space to follow path 148. In another example, the path of vehicle B may be adjusted, through routing or autonomous driving commands, to veer to the right, leaving path 148 safe for vehicle A to pass and avoid the vehicle boarding area.

Figure 6A:
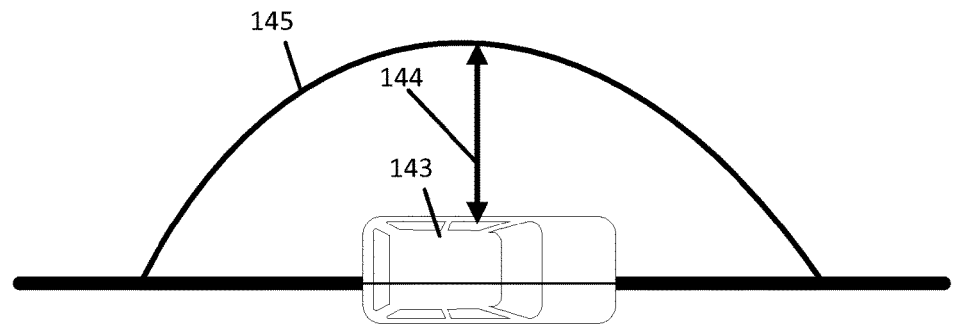
FIGS. 6A, 6B, and 6C illustrate example vehicle boarding areas.
Figure 6B:
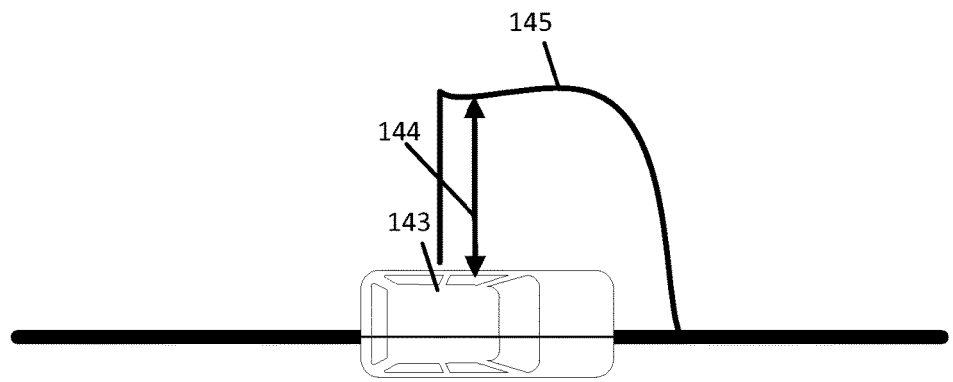
Figure 6C:
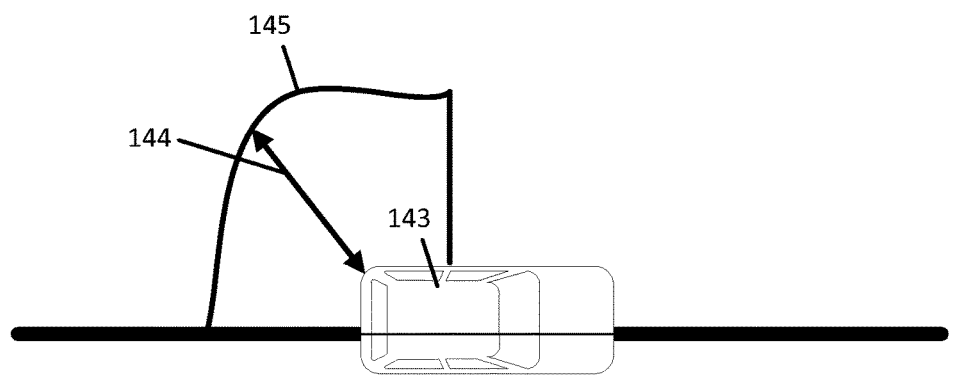

FIGS. 6A, 6B, and 6C illustrate example vehicle boarding areas 145 for vehicle 143. The shape of the vehicle boarding area 145 may vary based on one or more of a variety of factors. Example factors include time, type or shape of the vehicle 143, number and identity of passengers, location of the vehicle 143, type or functional classification of the road, traffic conditions, or other factors.

The shape of the vehicle boarding area 145 may be based on the type or shape of the vehicle 143. The shape of the vehicle boarding area 145 may be congruent to the shape of the vehicle. The shape of the vehicle boarding area 145 may be defined by an outline drawn at a predetermined distance 144 from the perimeter of the vehicle 143. Different vehicles have different shapes and corresponding vehicle boarding areas 145 have different shapes. The vehicle boarding area for a compact car may be smaller than a vehicle boarding area for a full size car. The vehicle boarding area for a full size car may be smaller than a vehicle boarding area for a truck.

The shape of the vehicle boarding area 145 may be based on the number and identity of passengers. FIG. 6B illustrates an example when the number of passengers is one and/or the identity of the passenger is a driver. The vehicle boarding area 145 defined in part by the predetermined distance 144 may be reduced to the area near the driver's door and the front of the vehicle. When the number of passengers is greater than a threshold number the vehicle boarding area 145 may be extended to include the back of the vehicle, as illustrated in FIG. 6A. The threshold number may be two so that the partial area for the vehicle boarding area 145 in FIG. 6B is used for one or two passengers and the full area for the vehicle boarding area 145 for more than two passengers.

In addition or in the alternative, the type of door may impact the shape of the vehicle boarding area 145. Some doors may open fully and other doors may open less than fully and require a smaller vehicle boarding area 145. Data for the boarding area 145 may include first data for at least one door and second data for at least one cargo area. Different shapes and sizes for the vehicle boarding area 145 may be assigned to different doors. For example, a cargo area may require more space for loading or unloading cargo than a typical door requires for boarding or unboarding passengers. The vehicle boarding area 145 may change shape according to real time data from multiple door sensors. That is, the boarding area 145 may extend around each door while that door is opened.

The shape of the vehicle boarding area 145 may be based on location of the vehicle 143. The location of the vehicle 143 with respect to the lane of travel may define shape of the vehicle boarding area 145. The vehicle boarding area 145 may be increased according to the distance from the vehicle to the lane of travel. When the parking spot is farther away from the roadway, more space may be allocated to the shape of the vehicle boarding area 145. The location of the vehicle 143 with respect to the curb may define shape of the vehicle boarding area 145. When the parking spot is farther from the curb, less space may be allocated to the shape of the boarding area 145.

The shape of the vehicle boarding area 145 may be based on type or functional classification of the road. Example functional classifications are described below. Different types of roads may be assigned different shapes or sizes for the vehicle boarding areas 145. The database 123 may store a road type attribute for a road segment that describes the type or functional classification of the road segment. The server 125 or the mobile device 122 may determine the shape or size of the vehicle boarding area 145 according to the road type attribute. Larger roads (e.g., highways) may be assigned a larger vehicle boarding area 145 because vehicles at high speed may need more space to safely avoid boarding passengers. Smaller roads (e.g., local roads or side streets) may be assigned a smaller vehicle boarding area 145 because vehicles at low speed may need less space to safely boarding passengers. Alternatively, the opposite may be true because more space is available for smaller roads (i.e., smaller roads may be assigned a larger vehicle boarding area 145).

The shape of the vehicle boarding area 145 may be based on traffic conditions. The server 125 or the mobile device 122 may request traffic data from an external source and modify the shape of the vehicle boarding area 145 in response to the traffic data. The shape of the vehicle boarding area 145 may be increased when traffic is high (e.g., slow speed) because the vehicle boarding area will not likely further disrupt the traffic. Alternatively, the shape of the vehicle boarding area 145 may be modified according to time of day or day of week, which corresponds to predicted traffic levels.

The shape of the vehicle boarding area 145 may be based on geometry of the roadway. The server 125 or the mobile device 122 may determine a road segment associated with the vehicle boarding area 145 based on a location of the vehicle or predicted location of the vehicle. From the database 123 or 133, the server 125 or mobile device 122 may access a road geometry or one or more road attributes that describe the curvature, shape, or width of the roadway. The shape of the vehicle boarding area 145 may be selected based on curvature of the roadway. For example, when the curvature exceeds a threshold, the size of the boarding area 145 is increased to account for poor visibility. In another example, when the curvature exceeds a threshold, the corresponding section of the road may be ineligible for a vehicle boarding area. Thus, the vehicle boarding area may be disabled when the curvature or shape of the roadway is greater than the threshold.

FIG. 6C includes an example for the vehicle boarding area 145 for a ridesharing application. When ridesharing, when the vehicle stops, the driver often remains in the vehicle while one or more passengers exit the vehicle. Usually, the one or more passengers exit from the rear of the vehicle. As illustrated by FIG. 6C, the vehicle boarding area 145 may be sized and positioned for passengers in the rear of the vehicle. The ridesharing application may send data to the mobile device 122 or the server 125 for the number of passengers, which impacts the size or shape of the vehicle boarding area 145. In addition, the time period for the vehicle boarding area 145 may be modified for ridesharing (e.g., the time period may be increased to include time for payment or confirmation by the ridesharing application).

In one example, the location of the vehicle boarding area 145 is selected based on the ridesharing application. For example, the vehicle boarding area 145 may only be generated when the ridesharing vehicle is located at a designated dropoff location. The ridesharing application may select a designation dropoff location and calculate the vehicle boarding area 145 based on the designated dropoff location. The designated dropoff location and corresponding boarding area 145 may be reserved for ridesharing vehicles. That is, a different vehicle boarding area may be assigned to a rideshare vehicle than assigned to other vehicles.

The server 125 or the mobile device 122 may determine a parking location based on the requirements for the vehicle boarding area 145. The database 123 may store parking locations in association with locations or road segments. The parking locations may be paired with a value for the available space for the vehicle boarding area 145. Based on the examples herein (e.g., number of passengers) the parking location is selected such that sufficient space is available for the vehicle boarding area 145.

Figure 7:
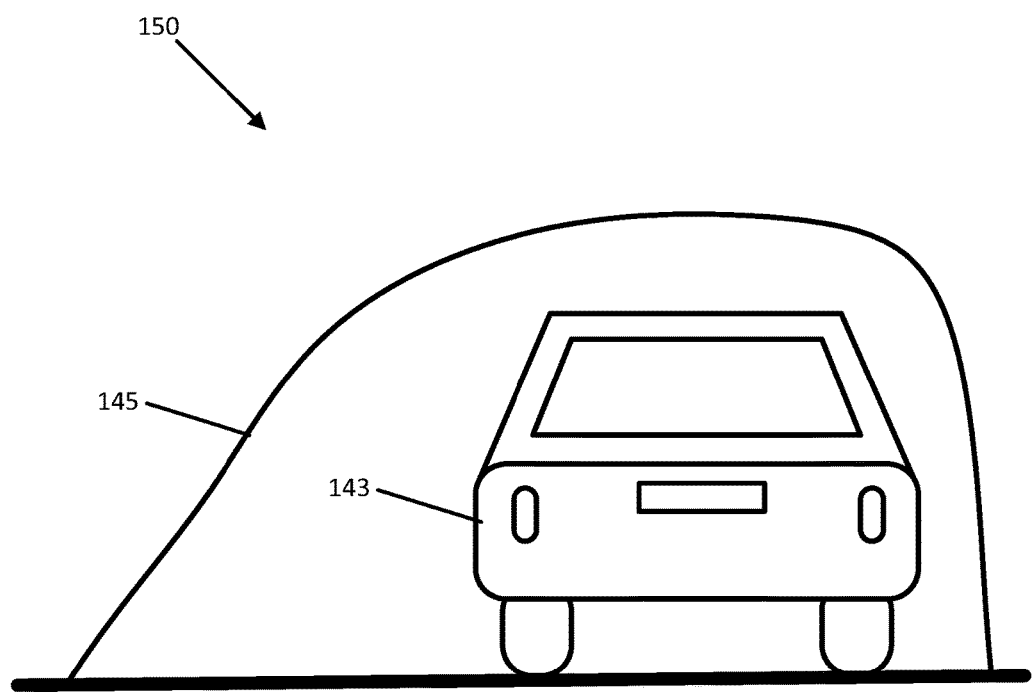
FIG. 7 illustrates an example three-dimensional view of a vehicle boarding area.

FIG. 7 illustrates an example three-dimensional view 150 of a vehicle boarding area 145. The three-dimensional view 150 may be display in either the parking vehicle or the approaching vehicle the navigation system or driving system. The three-dimensional view 150 may aid the driver of the approaching vehicle in avoiding the vehicle boarding area. The three-dimensional view 150 may be displayed in an augmented reality view on mobile device 122 to illustrate the vehicle boarding area. The height of the three-dimensional view 150 of the vehicle boarding area 145 may be a default value or selected based on an estimated height of the passengers.

Figure 8:
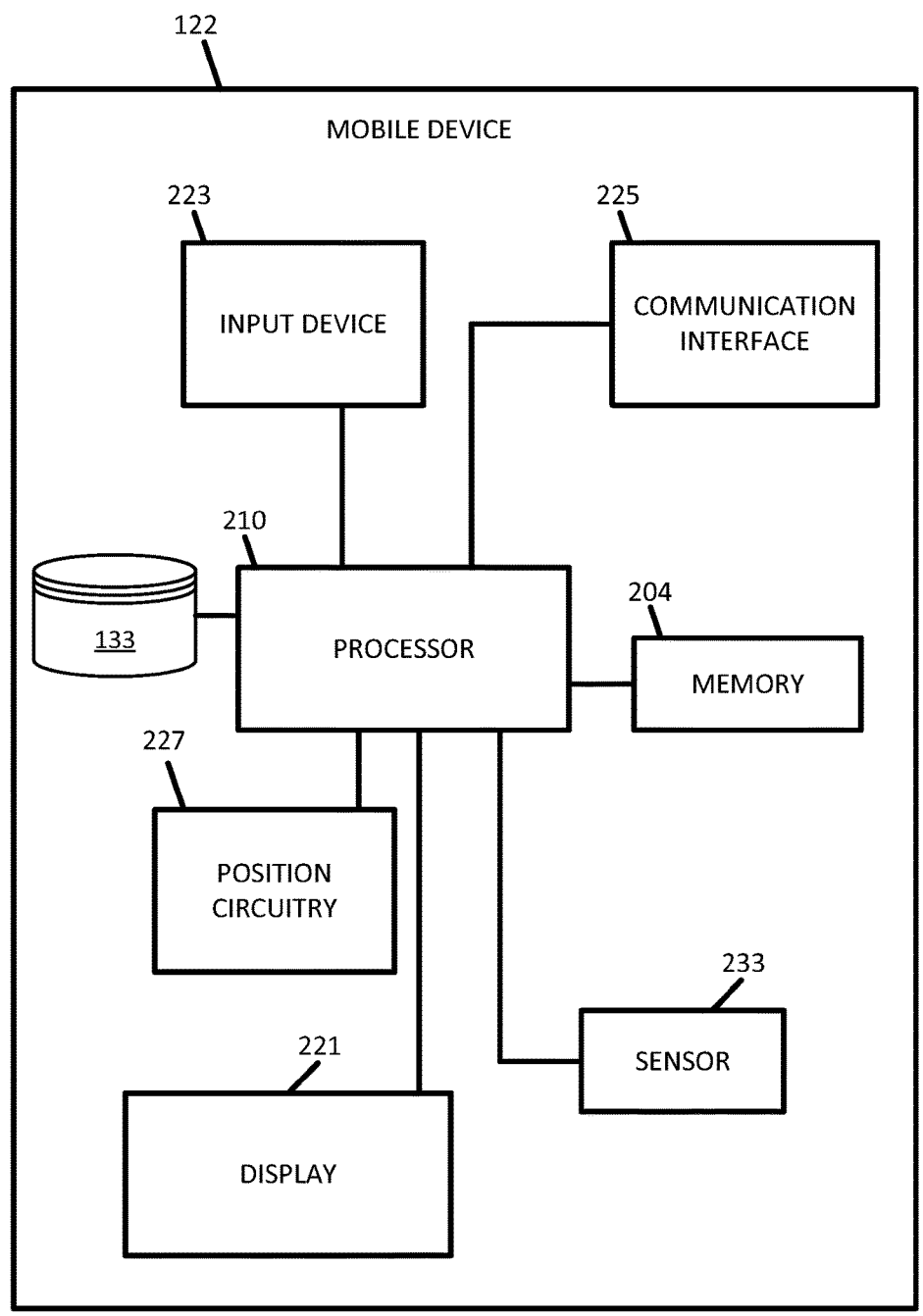
FIG. 8 illustrates an example mobile device.
Figure 9:
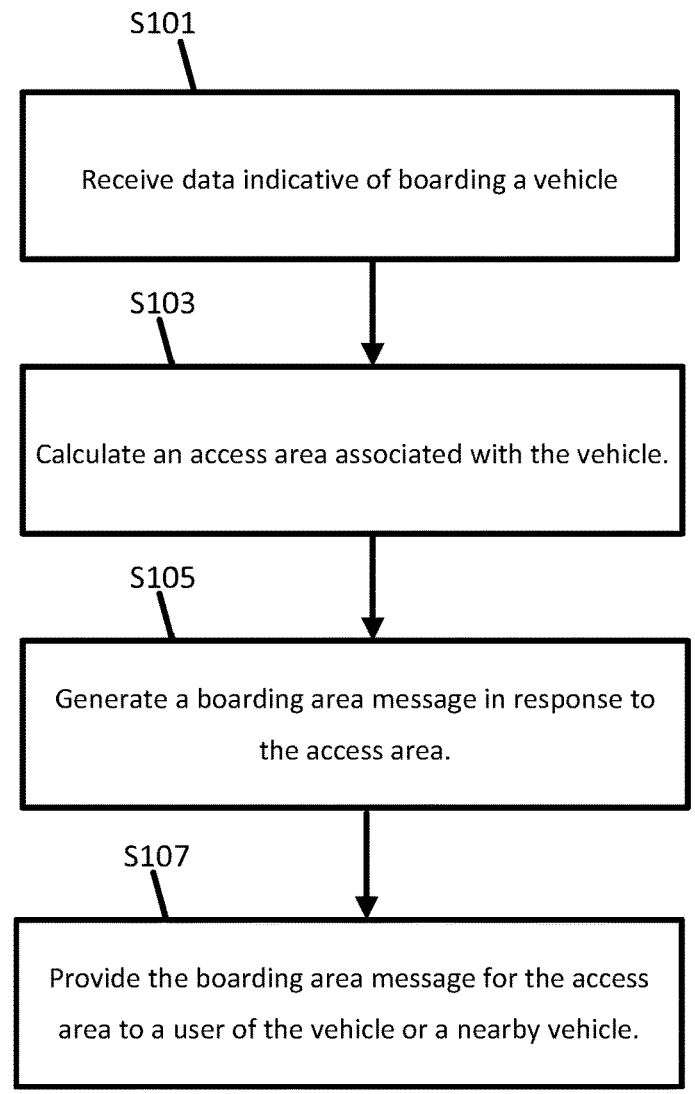
FIG. 9 illustrates an example flowchart for the mobile device of FIG. 9.

FIG. 8 illustrates an exemplary mobile device 122 of the system of FIG. 1. The mobile device 122 includes a processor 210, a local database 133, a memory 204, an input device 223, a communication interface 225, position circuitry 227, a display 221, a sensor 233. The input device 223 may receive settings to select vehicle boarding area requirements. The input device 223 may receive entry of road segments, a route, or a destination or waypoints to define a route. Additional, different, or fewer components are possible for the mobile device 122. FIG. 9 illustrates an example flowchart for the mobile device of FIG. 8. Additional, different, or fewer steps may be included.

The sensor 233 or the processor 210 generates data indicative of boarding a vehicle. The data indicative of boarding a vehicle may include sensor data from the sensor 233 for detecting the behavior of users that suggests the vehicle is being boarded, will be boarded, is being unboarded, or will be unboarded. The sensor data may include location data that indicates the vehicle is located in a parking spot or predicted to be located in the parking spot.

At act S101, the communication interface 225 or the processor 210 receives the data indicative of boarding a vehicle. The communication interface 225 or the processor 210 may be a means for the data indicative of boarding a vehicle. The processor 210 may include circuitry or a module or an application specific controller as a means for the data indicative of boarding a vehicle.

At act S103, the processor 210 calculates an access area associated with the vehicle. The access area defined based on a spatial area requirement or a temporal requirement. The processor 210 may include circuitry or a module or an application specific controller as a means for calculating an access area associated with the vehicle.

At act S105, the processor 210 generates a boarding area message in response to the access area. The message may include instructions for the vehicle to be boarded and the instructions may instruct the driver or the vehicle where to park. In some examples, the message may instruct the driver or vehicle to adjust the current parking spot (e.g., move forward or reverse a distance) to improve the boarding area. The message may include instructions for a nearby vehicle to avoid the boarding area.

The boarding area message may include dimensions of the boarding zone. The boarding area message may include a distance in x/y or x/y/z centimeters away from the vehicle's edges. Alternatively, the boarding zone can be specified by a distance in x/y or x/y/z centimeters from the middle point of the vehicle's location or coordinates. Alternatively, a polygon-shape geofence around the vehicle may define the vehicle boarding zone.

As the boarding area is dynamic, any of the dimensions or locations may be communicated with a timestamp and a time period of validity. The boarding message sent by the vehicle or server specifying the boarding zone may be time-dependent, allowing for varying dimensions as time progresses.

The processor 210 may include circuitry or a module or an application specific controller as a means for generating a boarding area message in response to the access area.

At act S107, the processor 210, the communication device 225, or the display 211 provides the boarding area message for the access area to a user of the vehicle or a nearby vehicle. The processor 210 may provide the boarding area message to the communication device 225 for communication to the server 125 or a nearby vehicle (e.g., another mobile device 122 or vehicle 124) using vehicle to vehicle communication. Thus, one vehicle may communication to another vehicle directly the boarding area message including at least the time period for the validity of the boarding area and/or at least the dimensions or location for the boarding area. The receiving vehicle or mobile device may receive the boarding area message and extract the time period and/or the dimensions and location of the boarding area. From the time period, the receiving vehicle or mobile device determines when to apply the boarding area. From the dimensions and location of the boarding area, the receiving vehicle or mobile, determines where to apply the boarding area. The boarding area may be applied by adjusting a route, a driving instruction, a driver warning, or a driving command according to the boarding area. The boarding message can be transmitted between vehicles or between a vehicle and the server using various protocols/message formats, such as protobuf, JSON, XML, or another format.

The processor 210 may include circuitry or a module or an application specific controller as a means for providing the boarding area message for the access area to a user of the vehicle or a nearby vehicle. The communication device 225 or the display 211 may be a means for providing the boarding area message for the access area to a user of the vehicle or a nearby vehicle. Either the communication device 225 or the display 211 may correspond to an interface configured to provide the boarding area message for the boarding area of the first vehicle to a second vehicle or to a user.

The boarding area message, including the shape, timing, expiration, or other information may be conveyed to the user that is boarding or unboarding or about to board or unboard the vehicle through the mobile device 122, a wearable device, or the infotainment unit of the vehicle. The boarding area can be conveyed to the users as simple data about the shape or duration of the boarding area, or the boarding area may be illustrated using a more engaging animated display.

The mobile device 122 may be configured to execute routing algorithms to determine an optimum route to travel along a road network from an origin location to a destination location in a geographic region. The optimum route may avoid the vehicle boarding areas. Using input(s) including map matching values from the server 125, a mobile device 122 examines potential routes between the origin location and the destination location to determine the optimum route. The mobile device 122, which may be referred to as a navigation device, may then provide the end user with information about the optimum route in the form of guidance that identifies the maneuvers required to be taken by the end user to travel from the origin to the destination location while avoiding the vehicle boarding areas. Some mobile device 122 show detailed maps on displays outlining the route, the types of maneuvers to be taken at various locations along the route, locations of certain types of features, and so on. Possible routes may be calculated based on a Dijkstra method, an A-star algorithm or search, and/or other route exploration or calculation algorithms that may be modified to take into consideration assigned cost values of the underlying road segments.

The mobile device 122 may include various types of communication interfaces or communication with the network 127 as the communication network characteristic. The types may include cellular devices (e.g., 3G, 4G, 4G-LTE, 5G or later developed mobile standards), wireless fidelity devices (e.g., IEEE 802.11 family of standards), or another type of device. The mobile device 122 may be configured with access technologies such as WiMAX, 3rd Generation Partnership Project (3GPP) standards, 3GPP2 and WLAN based access architectures. The types of communication may be telephonic, text message, instant message, short message service, or mobile application communication. The 5G may include Edge Computing, which allows very low latency communication, as processing is done at the "edge" of the network, e.g. at the access point. This would allow for data at the mobile device 122 to be collected and distributed quickly among participants in the vicinity of the access point. Vehicles in autonomous mode may communicate with other vehicles nearby through this mechanism.

Figure 10:
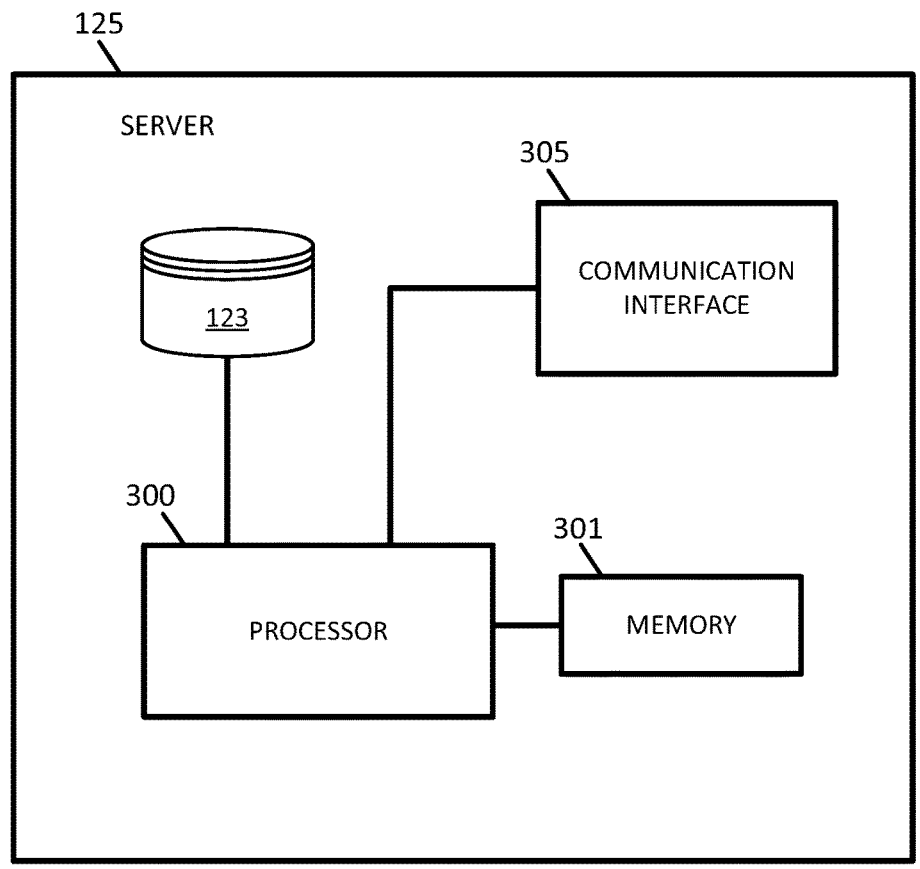
FIG. 10 illustrates an example server.
Figure 11:
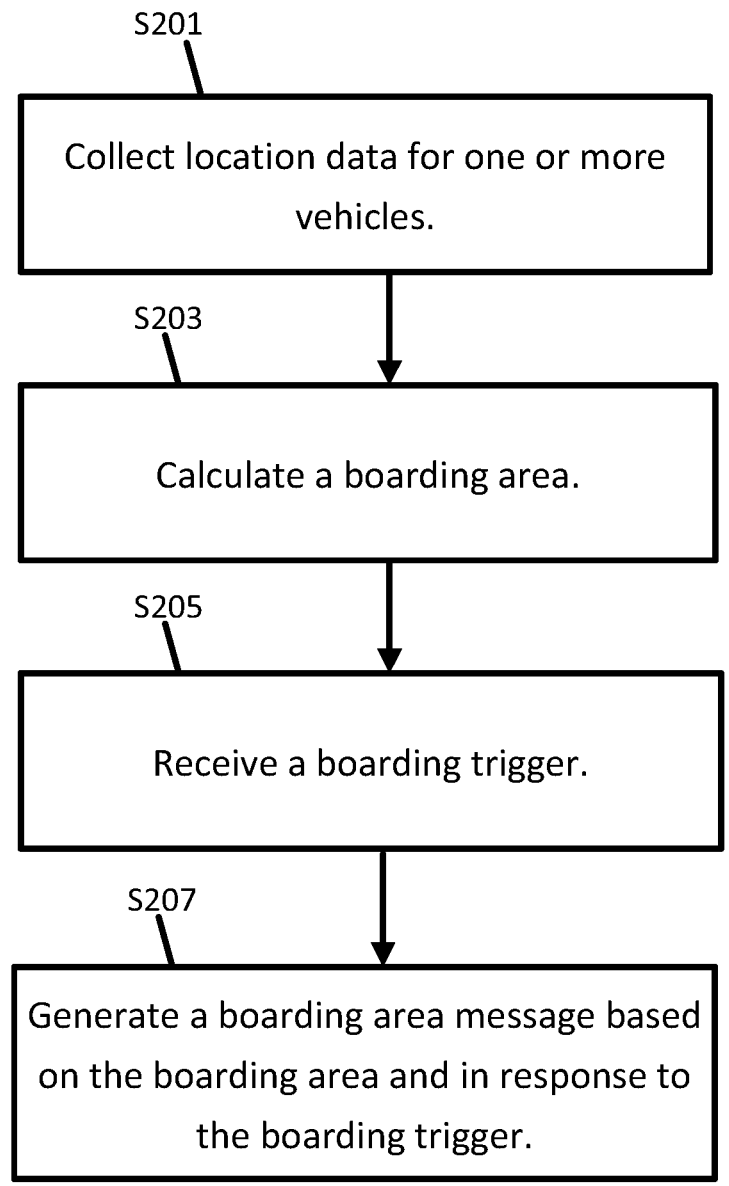
FIG. 11 illustrates an example flowchart for the server of FIG. 10.

FIG. 10 illustrates an example server 125, which may apply to the system of FIG. 1. The server 125 includes a processor 300, a communication interface 305, a memory 301, and a database 123. An input device (e.g., keyboard or personal computer) may be used to enter settings to the server 125. Additional, different, or fewer components may be provided in the server 125. FIG. 11 illustrates an example flowchart for the operation of server 125 in building an occupancy grid. Additional, different, or fewer acts may be provided.

At act S201, the processor 300 or the communication interface 305 collects location data for one or more vehicles. The location data may be collected by position circuity at the vehicles. At various times some of the vehicles may be parked and other vehicles are aided to avoid the boarding area of the parking vehicles.

At act S203, the processor 300 calculates a boarding area based on the location for one or more vehicles. The boarding area may depend on user selections. The boarding area may depend on various examples including the number of passengers and the geographic area of the boarding area. The boarding area may depend on slope, curvature, or the type of road. In one example, the boarding area is assigned to multiple vehicles. For example, two vehicles may be parking near one another and their boarding areas are combined into a larger boarding area.

At act S205, the processor 300 or the communication interface 305 receives a boarding trigger. The boarding trigger may include an action of the vehicle such as parking or entering a parking area or edge of a roadway. The boarding trigger may include an action of a user in the vehicle such as speaking word related to boarding or making a boarding area request on a mobile device or an in vehicle user interface. The boarding trigger may include an action of a user outside of the vehicle such as touching the vehicle or door handle, approaching the vehicle, or making a boarding request on a mobile device, a wireless transmitter, or a user interface on the door of the vehicle.

At act S207, the processor 300 or the communication interface generates a boarding area message including data related to the boarding area in response to the boarding trigger. The boarding area message may be a message broadcast to all vehicles within a threshold distance from the boarding area. The threshold distance may be 10 feet, 100 feet, 100 meters, or 200 meters. The threshold distance may be variable. The threshold distance may vary according to time of day, speed of vehicle, or another factor. In response to the boarding area message, a parking instruction may be generated. The parking instruction may instruct a user or vehicle to park in location that includes space required by the boarding area requirement. The parking instruction may instruct a second vehicle to park adjacent to the boarding area if a concatenation of boarding areas is to be achieved. Parking adjacent to the first vehicle may be done either in front or behind the first vehicle to drop off or pick up as near to the destination as possible and possibly maintain the concatenation of the boarding area.

Figure 12:
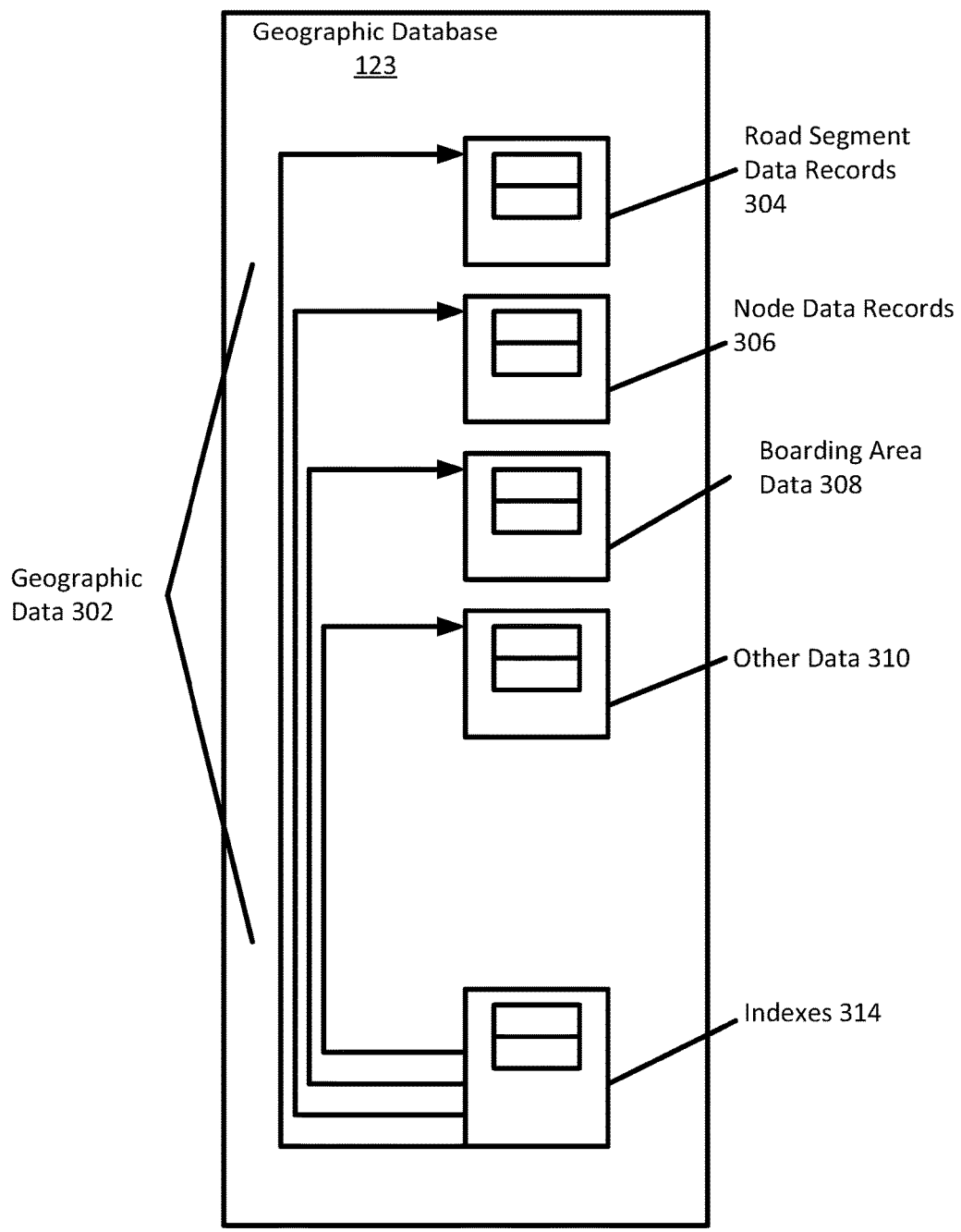
FIG. 12 illustrates an example arrangement for a geographic database.

In FIG. 12, the geographic database 123 may contain at least one road segment database record 304 (also referred to as "entity" or "entry") for each road segment in a particular geographic region. Any of the features of geographic database 123 may be applied to local databases 133. The geographic database 123 may also include a node database record 306 (or "entity" or "entry") for each node in a particular geographic region. The terms "nodes" and "segments" represent only one terminology for describing these physical geographic features, and other terminology for describing these features is intended to be encompassed within the scope of these concepts. The geographic database 123 may also include location fingerprint data for specific locations in a particular geographic region.

The geographic database 123 may include other kinds of data 310. The other kinds of data 310 may represent other kinds of geographic features or anything else. The other kinds of data may include point of interest (POI) data. For example, the POI data may include POI records comprising a type (e.g., the type of POI, such as restaurant, hotel, city hall, police station, historical marker, ATM, golf course, etc.), location of the POI, a phone number, hours of operation, etc.

The geographic database 123 also includes indexes 314. The indexes 314 may include various types of indexes that relate the different types of data to each other or that relate to other aspects of the data contained in the geographic database 123. For example, the indexes 314 may relate the nodes in the node data records 306 with the end points of a road segment in the road segment data records 304. As another example, the indexes 314 may relate boarding area data 308 with a road segment in the segment data records 304 or a geographic coordinate. An index 314 may, for example, store data relating to one or more locations and related boarding area data 308 for each location. The boarding area data 308 may include locations of potential boarding areas, the size of the boarding area, or a relationship for the factors that change the shape of the boarding area.

The geographic database 123 may also include other attributes of or about roads such as, for example, geographic coordinates, physical geographic features (e.g., lakes, rivers, railroads, municipalities, etc.) street names, address ranges, speed limits, turn restrictions at intersections, and/or other navigation related attributes (e.g., one or more of the road segments is part of a highway or toll way, the location of stop signs and/or stoplights along the road segments), as well as POIs, such as gasoline stations, hotels, restaurants, museums, stadiums, offices, automobile dealerships, auto repair shops, buildings, stores, parks, municipal facilities, other businesses, etc. The geographic database 123 may also contain one or more node data record(s) 306 which may be associated with attributes (e.g., about the intersections) such as, for example, geographic coordinates, street names, address ranges, speed limits, turn restrictions at intersections, and other navigation related attributes, as well as POIs such as, for example, gasoline stations, hotels, restaurants, museums, stadiums, offices, automobile dealerships, auto repair shops, buildings, stores, parks, etc. The geographic data 302 may additionally or alternatively include other data records such as, for example, POI data records, topographical data records, cartographic data records, routing data, and maneuver data. Other contents of the database 123 relevant for this invention are: temperature, altitude or elevation, lighting, sound or noise level, humidity, atmospheric pressure, wind speed, the presence of magnetic fields, electromagnetic interference, or radio- and micro-waves, cell tower and wi-fi information, such as available cell tower and wi-fi access points, and attributes pertaining to specific approaches to a specific location.

The geographic database 123 may include historical traffic speed data for one or more road segments. The geographic database 123 may also include traffic attributes for one or more road segments. A traffic attribute may indicate that a road segment has a high probability of traffic congestion.

Figure 13:
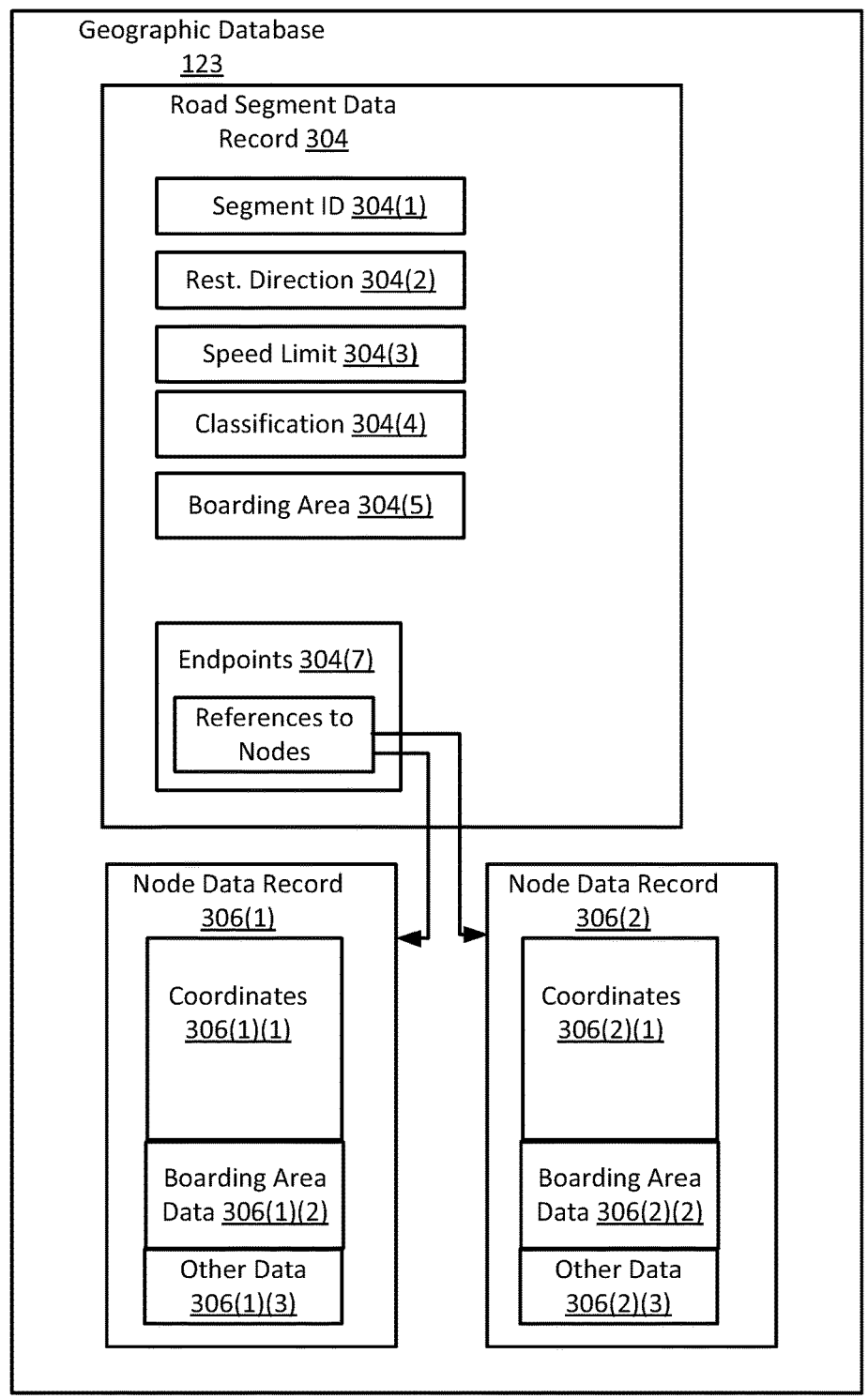
FIG. 13 illustrates another example arrangement for a geographic database.

FIG. 13 shows some of the components of a road segment data record 304 contained in the geographic database 123 according to one embodiment. The road segment data record 304 may include a segment ID 304(1) by which the data record can be identified in the geographic database 123. Each road segment data record 304 may have associated with it information (such as "attributes", "fields", etc.) that describes features of the represented road segment. The road segment data record 304 may include data 304(2) that indicate the restrictions, if any, on the direction of vehicular travel permitted on the represented road segment. The road segment data record 304 may include data 304(3) that indicate a speed limit or speed category (i.e., the maximum permitted vehicular speed of travel) on the represented road segment. The road segment data record 304 may also include classification data 304(4) indicating whether the represented road segment is part of a controlled access road (such as an expressway), a ramp to a controlled access road, a bridge, a tunnel, a toll road, a ferry, and so on. The road segment data record may include location fingerprint data, for example a set of sensor data for a particular location.

The geographic database 123 may include road segment data records 304 (or data entities) that describe features such as boarding areas 304(5). The vehicle boarding areas 304(5) may be stored according to location boundaries or vertices. The vehicle boarding areas 304(5) may be stored as a field or record using a scale of values such as from 1 to 100 (1 being the smallest boarding area, 100 being the largest boarding area). The vehicle boarding area data may be stored using categories such as low, medium, or high. Additional schema may be used to describe the vehicle boarding area data. The attribute data may be stored in relation to a link/segment 304, a node 306, a strand of links, a location fingerprint, an area, or a region. The geographic database 123 may store information or settings for display preferences. The geographic database 123 may be coupled to a display. The display may be configured to display the roadway network and data entities using different colors or schemes. The geographic database 123 may provide different display information relating to where open parking spots may exist, for example.

The road segment data record 304 also includes data 304(7) providing the geographic coordinates (e.g., the latitude and longitude) of the end points of the represented road segment. In one embodiment, the data 304(7) are references to the node data records 306 that represent the nodes corresponding to the end points of the represented road segment.

The road segment data record 304 may also include or be associated with other data 304(7) that refer to various other attributes of the represented road segment. The various attributes associated with a road segment may be included in a single road segment record, or may be included in more than one type of record which cross-references to each other. For example, the road segment data record 304 may include data identifying what turn restrictions exist at each of the nodes which correspond to intersections at the ends of the road portion represented by the road segment, the name, or names by which the represented road segment is identified, the street address ranges along the represented road segment, and so on.

FIG. 13 also shows some of the components of a node data record 306 that may be contained in the geographic database 123. Each of the node data records 306 may have associated information (such as "attributes", "fields", etc.) that allows identification of the road segment(s) that connect to it and/or its geographic position (e.g., its latitude and longitude coordinates). The node data records 306(1) and 306(2) include the latitude and longitude coordinates 306(1)(1) and 306(2)(1) for their node, and boarding area data 306(1)(2) and 306(2)(2). The node data records 306(1) and 306(2) may also include other data 306(1)(3) and 306(2)(3) that refer to various other attributes of the nodes.

The geographic database 123 may be maintained by a content provider (e.g., a map developer). By way of example, the map developer may collect geographic data to generate and enhance the geographic database 123. The map developer may obtain data from sources, such as businesses, municipalities, or respective geographic authorities. In addition, the map developer may employ field personnel to travel throughout a geographic region to observe features and/or record information about the roadway. Remote sensing, such as aerial or satellite photography, may be used. The database 123 may be incorporated in or connected to the server 125.

The geographic database 123 and the data stored within the geographic database 123 may be licensed or delivered on-demand. Other navigational services or traffic server providers may access the location fingerprint data, traffic data and/or the predicted parking availability data stored in the geographic database 123. Data including the vehicle boarding areas or predicted parking availability data based on the vehicle boarding areas may be broadcast as a service. Some vehicles may receive the broadcast to identify and avoid the vehicle boarding areas by navigating away from the vehicle boarding areas. Some vehicles may receive the broadcast to identify the vehicle boarding areas to navigate towards available parking or standing areas for the vehicle boarding areas.

Communication between the mobile device 122 and the server 125 through the network 127 may use a variety of types of wireless networks. Example wireless networks include cellular networks, the family of protocols known as WiFi or IEEE 802.11, the family of protocols known as Bluetooth, or another protocol. The cellular technologies may be analog advanced mobile phone system (AMPS), the global system for mobile communication (GSM), third generation partnership project (3GPP), code division multiple access (CDMA), personal handy-phone system (PHS), and 4G or long term evolution (LTE) standards, or another protocol.

The controller 210 and/or processor 300 may include a general processor, digital signal processor, an application specific integrated circuit (ASIC), field programmable gate array (FPGA), analog circuit, digital circuit, combinations thereof, or other now known or later developed processor. The controller 210 and/or processor 300 may be a single device or combinations of devices, such as associated with a network, distributed processing, or cloud computing.

The memory 204 and/or memory 301 may be a volatile memory or a non-volatile memory. The memory 204 and/or memory 301 may include one or more of a read only memory (ROM), random access memory (RAM), a flash memory, an electronic erasable program read only memory (EEPROM), or other type of memory. The memory 204 and/or memory 301 may be removable from the mobile device 122, such as a secure digital (SD) memory card.

The communication interface 225 and/or communication interface 305 may include any operable connection. An operable connection may be one in which signals, physical communications, and/or logical communications may be sent and/or received. An operable connection may include a physical interface, an electrical interface, and/or a data interface. The communication interface 225 and/or communication interface 305 provides for wireless and/or wired communications in any now known or later developed format.

The databases 123 and 133 may include geographic data used for traffic and/or navigation-related applications. The geographic data may include data representing a road network or system including road segment data and node data. The road segment data represent roads, and the node data represent the ends or intersections of the roads. The road segment data and the node data indicate the location of the roads and intersections as well as various attributes of the roads and intersections. Other formats than road segments and nodes may be used for the geographic data. The geographic data may include structured cartographic data or pedestrian routes.

The databases may also include other attributes of or about the roads such as, for example, geographic coordinates, street names, address ranges, speed limits, turn restrictions at intersections, and/or other navigation related attributes (e.g., one or more of the road segments is part of a highway or toll way, the location of stop signs and/or stoplights along the road segments), as well as points of interest (POIs), such as gasoline stations, hotels, restaurants, museums, stadiums, offices, automobile dealerships, auto repair shops, buildings, stores, parks, etc. The databases may also contain one or more node data record(s) which may be associated with attributes (e.g., about the intersections) such as, for example, geographic coordinates, street names, address ranges, speed limits, turn restrictions at intersections, and other navigation related attributes, as well as POIs such as, for example, gasoline stations, hotels, restaurants, museums, stadiums, offices, automobile dealerships, auto repair shops, buildings, stores, parks, etc. The geographic data may additionally or alternatively include other data records such as, for example, POI data records, topographical data records, cartographic data records, routing data, and maneuver data.

The databases may include historical traffic speed data for one or more road segments. The databases may also include traffic attributes for one or more road segments. A traffic attribute may indicate that a road segment has a high probability of traffic congestion.

The input device 223 may be one or more buttons, keypad, keyboard, mouse, stylus pen, trackball, rocker switch, touch pad, voice recognition circuit, or other device or component for inputting data to the mobile device 122.

The input device 223 and display 221 may be combined as a touch screen, which may be capacitive or resistive. The display 221 may be a liquid crystal display (LCD) panel, light emitting diode (LED) screen, thin film transistor screen, or another type of display. The output interface of the display 221 may also include audio capabilities, or speakers.

The positioning circuitry 227 may include suitable sensing devices that measure the traveling distance, speed, direction, and so on, of the mobile device 122. The positioning system may also include a receiver and correlation chip to obtain a GPS signal. Alternatively or additionally, the one or more detectors or sensors may include an accelerometer and/or a magnetic sensor built or embedded into or within the interior of the mobile device 122. The accelerometer is operable to detect, recognize, or measure the rate of change of translational and/or rotational movement of the mobile device 122. The magnetic sensor, or a compass, is configured to generate data indicative of a heading of the mobile device 122. Data from the accelerometer and the magnetic sensor may indicate orientation of the mobile device 122. The mobile device 122 receives location data from the positioning system. The location data indicates the location of the mobile device 122.

The positioning circuitry 227 may include a Global Positioning System (GPS), Global Navigation Satellite System (GLONASS), or a cellular or similar position sensor for providing location data. The positioning system may utilize GPS-type technology, a dead reckoning-type system, cellular location, or combinations of these or other systems. The positioning circuitry 227 may include suitable sensing devices that measure the traveling distance, speed, direction, and so on, of the mobile device 122. The positioning system may also include a receiver and correlation chip to obtain a GPS signal. The mobile device 122 receives location data from the positioning system. The location data indicates the location of the mobile device 122.

The position circuitry 227 may also include gyroscopes, accelerometers, magnetometers, or any other device for tracking or determining movement of a mobile device. The gyroscope is operable to detect, recognize, or measure the current orientation, or changes in orientation, of a mobile device. Gyroscope orientation change detection may operate as a measure of yaw, pitch, or roll of the mobile device.

One example of a simple system includes the functional classification maintained by the United States Federal Highway administration. The simple system includes arterial roads, collector roads, and local roads. The functional classifications of roads balance between accessibility and speed. An arterial road has low accessibility but is the fastest mode of travel between two points. Arterial roads are typically used for long distance travel. Collector roads connect arterial roads to local roads. Collector roads are more accessible and slower than arterial roads. Local roads are accessible to individual homes and business. Local roads are the most accessible and slowest type of road.

An example of a complex functional classification system is the urban classification system. Interstates include high speed and controlled access roads that span long distances. The arterial roads are divided into principle arteries and minor arteries according to size. The collector roads are divided into major collectors and minor collectors according to size. Another example functional classification system divides long distance roads by type of road or the entity in control of the highway. The functional classification system includes interstate expressways, federal highways, state highways, local highways, and local access roads. Another functional classification system uses the highway tag system in the Open Street Map (OSM) system. The functional classification includes motorways, trunk roads, primary roads, secondary roads, tertiary roads, and residential roads.

The term "computer-readable medium" includes a single medium or multiple media, such as a centralized or distributed database, and/or associated caches and servers that store one or more sets of instructions. The term "computer-readable medium" shall also include any medium that is capable of storing, encoding or carrying a set of instructions for execution by a processor or that cause a computer system to perform any one or more of the methods or operations disclosed herein.

In a particular non-limiting, exemplary embodiment, the computer-readable medium can include a solid-state memory such as a memory card or other package that houses one or more non-volatile read-only memories. Further, the computer-readable medium can be a random access memory or other volatile re-writable memory. Additionally, the computer-readable medium can include a magneto-optical or optical medium, such as a disk or tapes or other storage device to capture carrier wave signals such as a signal communicated over a transmission medium. A digital file attachment to an e-mail or other self-contained information archive or set of archives may be considered a distribution medium that is a tangible storage medium. Accordingly, the disclosure is considered to include any one or more of a computer-readable medium or a distribution medium and other equivalents and successor media, in which data or instructions may be stored.

In an alternative embodiment, dedicated hardware implementations, such as application specific integrated circuits, programmable logic arrays and other hardware devices, can be constructed to implement one or more of the methods described herein. Applications that may include the apparatus and systems of various embodiments can broadly include a variety of electronic and computer systems. One or more embodiments described herein may implement functions using two or more specific interconnected hardware modules or devices with related control and data signals that can be communicated between and through the modules, or as portions of an application-specific integrated circuit.

In accordance with various embodiments of the present disclosure, the methods described herein may be implemented by software programs executable by a computer system. Further, in an exemplary, non-limited embodiment, implementations can include distributed processing, component/object distributed processing, and parallel processing. Alternatively, virtual computer system processing can be constructed to implement one or more of the methods or functionality as described herein.

Although the present specification describes components and functions that may be implemented in particular embodiments with reference to particular standards and protocols, the invention is not limited to such standards and protocols. For example, standards for Internet and other packet switched network transmission (e.g., TCP/IP, UDP/IP, HTML, HTTP, HTTPS) represent examples of the state of the art. Such standards are periodically superseded by faster or more efficient equivalents having essentially the same functions. Accordingly, replacement standards and protocols having the same or similar functions as those disclosed herein are considered equivalents thereof.

A computer program (also known as a program, software, software application, script, or code) can be written in any form of programming language, including compiled or interpreted languages, and it can be deployed in any form, including as a standalone program or as a module, component, subroutine, or other unit suitable for use in a computing environment. A computer program does not necessarily correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program can be deployed to be executed on one computer or on multiple computers that are located at one site or distributed across multiple sites and interconnected by a communication network.

The processes and logic flows described in this specification can be performed by one or more programmable processors executing one or more computer programs to perform functions by operating on input data and generating output. The processes and logic flows can also be performed by, and apparatus can also be implemented as, special purpose logic circuitry, e.g., an FPGA (field programmable gate array) or an ASIC (application specific integrated circuit).

As used in this application, the term 'circuitry' or 'circuit' refers to all of the following: (a) hardware-only circuit implementations (such as implementations in only analog and/or digital circuitry) and (b) to combinations of circuits and software (and/or firmware), such as (as applicable): (i) to a combination of processor(s) or (ii) to portions of processor(s)/software (including digital signal processor(s)), software, and memory(ies) that work together to cause an apparatus, such as a mobile phone or server, to perform various functions) and (c) to circuits, such as a microprocessor(s) or a portion of a microprocessor(s), that require software or firmware for operation, even if the software or firmware is not physically present.

This definition of 'circuitry' applies to all uses of this term in this application, including in any claims. As a further example, as used in this application, the term "circuitry" would also cover an implementation of merely a processor (or multiple processors) or portion of a processor and its (or their) accompanying software and/or firmware. The term "circuitry" would also cover, for example and if applicable to the particular claim element, a baseband integrated circuit or applications processor integrated circuit for a mobile phone or a similar integrated circuit in server, a cellular network device, or other network device.

Processors suitable for the execution of a computer program include, by way of example, both general and special purpose microprocessors, and anyone or more processors of any kind of digital computer. Generally, a processor receives instructions and data from a read only memory or a random access memory or both. The essential elements of a computer are a processor for performing instructions and one or more memory devices for storing instructions and data. Generally, a computer also includes, or be operatively coupled to receive data from or transfer data to, or both, one or more mass storage devices for storing data, e.g., magnetic, magneto optical disks, or optical disks. However, a computer need not have such devices. Moreover, a computer can be embedded in another device, e.g., a mobile telephone, a personal digital assistant (PDA), a mobile audio player, a Global Positioning System (GPS) receiver, to name just a few. Computer readable media suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto optical disks; and CD ROM and DVD-ROM disks. The processor and the memory can be supplemented by, or incorporated in, special purpose logic circuitry. In an embodiment, a vehicle may be considered a mobile device, or the mobile device may be integrated into a vehicle.

To provide for interaction with a user, embodiments of the subject matter described in this specification can be implemented on a device having a display, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input.

The term "computer-readable medium" includes a single medium or multiple media, such as a centralized or distributed database, and/or associated caches and servers that store one or more sets of instructions. The term "computer-readable medium" shall also include any medium that is capable of storing, encoding or carrying a set of instructions for execution by a processor or that cause a computer system to perform any one or more of the methods or operations disclosed herein.

In a particular non-limiting, exemplary embodiment, the computer-readable medium can include a solid-state memory such as a memory card or other package that houses one or more non-volatile read-only memories. Further, the computer-readable medium can be a random access memory or other volatile re-writable memory. Additionally, the computer-readable medium can include a magneto-optical or optical medium, such as a disk or tapes or other storage device to capture carrier wave signals such as a signal communicated over a transmission medium. A digital file attachment to an e-mail or other self-contained information archive or set of archives may be considered a distribution medium that is a tangible storage medium. Accordingly, the disclosure is considered to include any one or more of a computer-readable medium or a distribution medium and other equivalents and successor media, in which data or instructions may be stored. These examples may be collectively referred to as a non-transitory computer readable medium.

In an alternative embodiment, dedicated hardware implementations, such as application specific integrated circuits, programmable logic arrays and other hardware devices, can be constructed to implement one or more of the methods described herein. Applications that may include the apparatus and systems of various embodiments can broadly include a variety of electronic and computer systems. One or more embodiments described herein may implement functions using two or more specific interconnected hardware modules or devices with related control and data signals that can be communicated between and through the modules, or as portions of an application-specific integrated circuit.

Embodiments of the subject matter described in this specification can be implemented in a computing system that includes a back end component, e.g., as a data server, or that includes a middleware component, e.g., an application server, or that includes a front end component, e.g., a client computer having a graphical user interface or a Web browser through which a user can interact with an implementation of the subject matter described in this specification, or any combination of one or more such back end, middleware, or front end components. The components of the system can be interconnected by any form or medium of digital data communication, e.g., a communication network. Examples of communication networks include a local area network ("LAN") and a wide area network ("WAN"), e.g., the Internet.

The computing system can include clients and servers. A client and server are generally remote from each other and typically interact through a communication network. The relationship of client and server arises by virtue of computer programs running on the respective computers and having a client-server relationship to each other.

The illustrations of the embodiments described herein are intended to provide a general understanding of the structure of the various embodiments. The illustrations are not intended to serve as a complete description of all of the elements and features of apparatus and systems that utilize the structures or methods described herein. Many other embodiments may be apparent to those of skill in the art upon reviewing the disclosure. Other embodiments may be utilized and derived from the disclosure, such that structural and logical substitutions and changes may be made without departing from the scope of the disclosure. Additionally, the illustrations are merely representational and may not be drawn to scale. Certain proportions within the illustrations may be exaggerated, while other proportions may be minimized. Accordingly, the disclosure and the figures are to be regarded as illustrative rather than restrictive.

While this specification contains many specifics, these should not be construed as limitations on the scope of the invention or of what may be claimed, but rather as descriptions of features specific to particular embodiments of the invention. Certain features that are described in this specification in the context of separate embodiments can also be implemented in combination in a single embodiment. Conversely, various features that are described in the context of a single embodiment can also be implemented in multiple embodiments separately or in any suitable sub-combination. Moreover, although features may be described above as acting in certain combinations and even initially claimed as such, one or more features from a claimed combination can in some cases be excised from the combination, and the claimed combination may be directed to a sub-combination or variation of a sub-combination.

Similarly, while operations are depicted in the drawings and described herein in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments.

One or more embodiments of the disclosure may be referred to herein, individually and/or collectively, by the term "invention" merely for convenience and without intending to voluntarily limit the scope of this application to any particular invention or inventive concept. Moreover, although specific embodiments have been illustrated and described herein, it should be appreciated that any subsequent arrangement designed to achieve the same or similar purpose may be substituted for the specific embodiments shown. This disclosure is intended to cover any and all subsequent adaptations or variations of various embodiments. Combinations of the above embodiments, and other embodiments not specifically described herein, are apparent to those of skill in the art upon reviewing the description.

The Abstract of the Disclosure is provided to comply with 37 C.F.R. § 1.72(b) and is submitted with the understanding that it will not be used to interpret or limit the scope or meaning of the claims. In addition, in the foregoing Detailed Description, various features may be grouped together or described in a single embodiment for the purpose of streamlining the disclosure. This disclosure is not to be interpreted as reflecting an intention that the claimed embodiments require more features than are expressly recited in each claim. Rather, as the following claims reflect, inventive subject matter may be directed to less than all of the features of any of the disclosed embodiments. Thus, the following claims are incorporated into the Detailed Description, with each claim standing on its own as defining separately claimed subject matter.

It is intended that the foregoing detailed description be regarded as illustrative rather than limiting and that it is understood that the following claims including all equivalents are intended to define the scope of the invention. The claims should not be read as limited to the described order or elements unless stated to that effect. Therefore, all embodiments that come within the scope and spirit of the following claims and equivalents thereto are claimed as the invention.

The following example embodiments of the invention are also disclosed:

Embodiment 1

A method comprising:
receiving data indicative of boarding a first vehicle;
calculating, by a processor, a boarding area requirement associated with the first vehicle;
generating, by the processor, a boarding area message in response to the boarding area requirement; and
providing the boarding area message for the boarding area of the first vehicle to a second vehicle or to a user.

Embodiment 2

The method of embodiment 1, wherein the boarding area requirement includes one or more dimensions for the boarding area.

Embodiment 3

The method of any of the preceding embodiments 1 to 2, wherein the one or more dimensions for the boarding area include a spatial boundary spaced from a perimeter of the first vehicle or another portion of the first vehicle.

Embodiment 4

The method of any of the preceding embodiments 1 to 3, wherein the boarding area requirement includes a time period for boarding the first vehicle, the boarding area message including the time period.

Embodiment 5

The method of any of the preceding embodiments 1 to 4, wherein the time period is a time period that the boarding area is applied.

Embodiment 6

The method of any of the preceding embodiments 1 to 5, wherein the boarding area requirement includes first data for at least one door and second data for at least one cargo area.

Embodiment 7

The method of any of the preceding embodiments 1 to 6, wherein the data indicative of boarding includes location tracking of a user for the first vehicle.

Embodiment 8

The method of any of the preceding embodiments 1 to 7, wherein the data indicative of boarding includes sensor data collected by one or more sensors associated with the first vehicle or the second vehicle.

Embodiment 9

The method of any of the preceding embodiments 1 to 8, wherein the data indicative of boarding includes data collected by a mobile device associated with one or more user activities.

Embodiment 10

The method of any of the preceding embodiments 1 to 9, further comprising:
generating a driving instruction for the second vehicle in response to the boarding area message.

Embodiment 11

The method of any of the preceding embodiments 1 to 10, wherein the boarding message includes a warning level or a critical level.

Embodiment 12

The method of any of the preceding embodiments 1 to 11, further comprising:
selecting a parking location for the first vehicle in response to the boarding area requirement.

Embodiment 13

The method of any of the preceding embodiments 1 to 12, further comprising:
selecting the second vehicle based on a traffic level associated with the first vehicle.

Embodiment 14

An apparatus comprising:
at least one sensor configured to collect data indicative of boarding a first vehicle;
a controller configured to calculate a boarding area requirement associated with the first vehicle and generate a boarding area message in response to the boarding area requirement; and
an interface configured to provide the boarding area message for the boarding area of the first vehicle to a second vehicle or to a user of the first vehicle.

Embodiment 15

The apparatus of embodiment 14, wherein the boarding area requirement includes a time period for boarding the first vehicle or a spatial boundary for boarding the first vehicle.

Embodiment 16

The apparatus of any of the preceding embodiments 14 to 15, wherein the data indicative of boarding includes sensor data collected by one or more sensors associated with the first vehicle or the second vehicle.

Embodiment 17

The apparatus of any of the preceding embodiments 14 to 16, further comprising:
generating a driving instruction for the second vehicle in response to the boarding area message or a driver warning in response to the boarding area message.

Embodiment 18

The method of any of the preceding embodiments 14 to 17, further comprising:
generating a driving command for the second vehicle in response to the boarding area message or a parking instruction for the first vehicle in response to the boarding area requirement.

Embodiment 19

A non-transitory computer readable medium including instructions for at least one processor to cause the at least one processor to perform:
receiving data indicative of boarding a vehicle, wherein the vehicle is located in a parking spot or predicted to be located in the parking spot;
calculating an access area associated with the vehicle, the access area defined based on a spatial area requirement or a temporal requirement;
generating a boarding area message in response to the access area; and
providing the boarding area message for the access area to a user of the vehicle or a nearby vehicle.

Embodiment 20

The non-transitory computer readable medium of embodiment 19, wherein the boarding area message is a warning including a location of the access area or a driving command for avoiding the location of the access area.

I claim:

1. A method for operation of a second vehicle in response to boarding associated with a first vehicle, the method comprising:
receiving a boarding area message at the second vehicle;
identifying a boarding area requirement for the first vehicle from the boarding area message; and
generating a vehicle message for the second vehicle in response to the boarding area requirement.

2. The method of claim 1, wherein the vehicle message includes a driving command for operation of the second vehicle.

3. The method of claim 1, wherein the vehicle message includes a warning for a second vehicle user.

4. The method of claim 1, further comprising:
calculating, at an autonomous driving system, an adjustment for a lane of travel for the second vehicle in response to the boarding area requirement.

5. The method of claim 1, further comprising:
generating a lane departure warning in response to the boarding area requirement.

6. The method of claim 1, wherein the boarding area requirement includes one or more dimensions for a boarding area.

7. The method of claim 6, wherein the one or more dimensions for the boarding area include a spatial boundary spaced from a perimeter of the first vehicle or another portion of the first vehicle.

8. The method of claim 1, wherein the boarding area requirement is selected based on a profile for a first vehicle user.

9. The method of claim 1, wherein the boarding area requirement is selected based on an external factor including weather, destination, traffic, or time of day.

10. The method of claim 1, further comprising:
calculating a route for the second vehicle in response to the boarding area requirement of the first vehicle.

11. The method of claim 1, wherein the boarding area requirement is selected based on a functional classification of a road associated with the first vehicle or the second vehicle.

12. The method of claim 1, wherein the boarding area requirement is selected based on a geometry of a road associated with the first vehicle or the second vehicle.

13. The method of claim 1, further comprising:
identifying a time period from the boarding area message; and
providing the vehicle message according to the time period.

14. An apparatus for operation of a second vehicle in response to boarding at a first vehicle, the apparatus comprising:
a communication interface configured to receive a boarding area message at the second vehicle; and
a controller configured to identify a boarding area requirement for the first vehicle from the boarding area message and generate a vehicle message in response to the boarding area requirement.

15. The apparatus of claim 14, wherein the vehicle message includes a driving command for operation of the second vehicle or includes a warning for a second vehicle user.

16. The apparatus of claim 14, wherein the controller is configured to calculate an adjustment for a lane of travel or a lane departure warning for the second vehicle in response to the boarding area requirement.

17. The apparatus of claim 14, wherein the boarding area requirement is selected based on a profile for a first vehicle user, a functional classification of a road associated with the first vehicle or the second vehicle, or a geometry of a road associated with the first vehicle or the second vehicle.

18. The apparatus of claim 14, wherein the controller is configured to calculate a route for the second vehicle in response to the boarding area requirement of the first vehicle.

19. A non-transitory computer readable medium including instructions for at least one processor to perform:
receiving a boarding area message for a first vehicle at a second vehicle;
identifying a boarding area requirement for the first vehicle from the boarding area message; and
generating a vehicle command for the second vehicle in response to the boarding area requirement.

20. The non-transitory computer readable medium of claim 19, the instructions for at least one processor further configured to perform:
calculating an adjustment for a lane of travel or a lane departure warning in response to the boarding area requirement.

* * * * *